United States Patent [19]
Sato et al.

[11] 4,355,389
[45] Oct. 19, 1982

[54] MICROPROGRAMMED INFORMATION PROCESSING SYSTEM HAVING SELF-CHECKING FUNCTION

[75] Inventors: Fumitaka Sato, Oume; Masahiko Iwane, Tokyo; Masaki Murayama, Fussa, all of Japan

[73] Assignee: Tokyo Shibaura Electric Co., Ltd., Japan

[21] Appl. No.: 115,368

[22] Filed: Jan. 25, 1980

Related U.S. Application Data

[63] Continuation of Ser. No. 886,828, Mar. 15, 1978, abandoned.

[30] Foreign Application Priority Data

Mar. 15, 1977 [JP] Japan .................................. 52-28432
Mar. 15, 1977 [JP] Japan .................................. 52-28433

[51] Int. Cl.³ ............................................. G06F 11/22
[52] U.S. Cl. ................................................... 371/18
[58] Field of Search ............................. 371/18, 17, 16; 364/200

[56] References Cited

U.S. PATENT DOCUMENTS 3,325,788  6/1967  Hackl ................................. 364/200
3,696,340  10/1972 Matsushita ......................... 364/200
3,909,802  9/1975  Cassarino, Jr. et al. ............ 364/200
3,953,717  4/1976  Rottier et al. ....................... 371/17
4,212,059  7/1980  Sato et al. ....................... 371/18 X Primary Examiner—David H. Malzahn
Attorney, Agent, or Firm—Finnegan, Henderson, Farabow, Garrett & Dunner

[57] ABSTRACT

An information processing system of the microprogram control type having a control storage is provided with an exclusive memory unit for storing only the address information of a microprogram stored in the control storage and an exclusive control circuit for reading a specific microprogram out of the control storage by the address information from the exclusive memory unit and executing the program read out. The exclusive control circuit operates when the information processing unit is an idle state to execute successively the micro-steps of the specified microprogram read out in accordance with the address information in the exclusive memory unit, thereby to verify the information processing unit.

16 Claims, 17 Drawing Figures

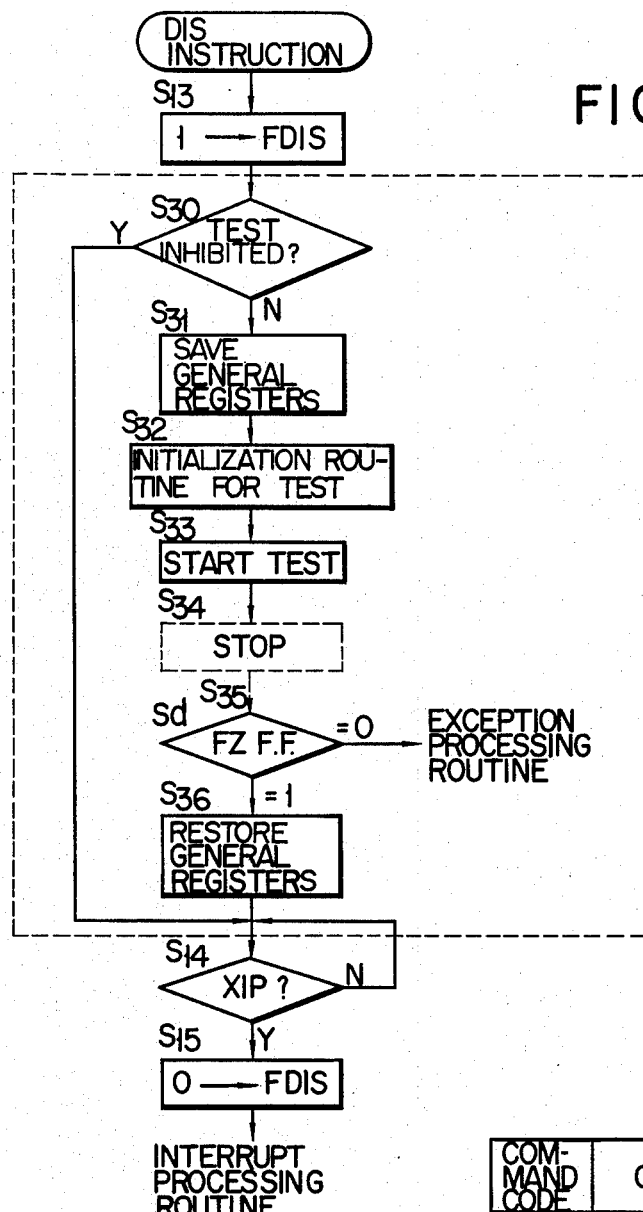
FIG. 4
FIG. 6
FIG. 5
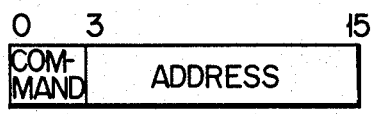

FIG. 7
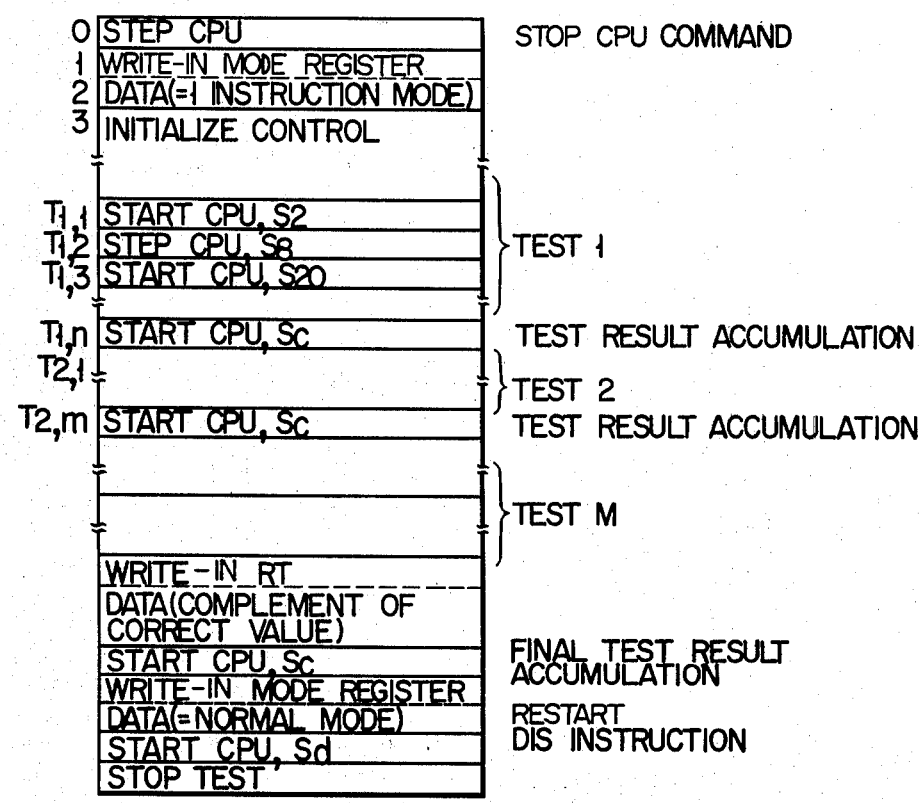
FIG. 7-A
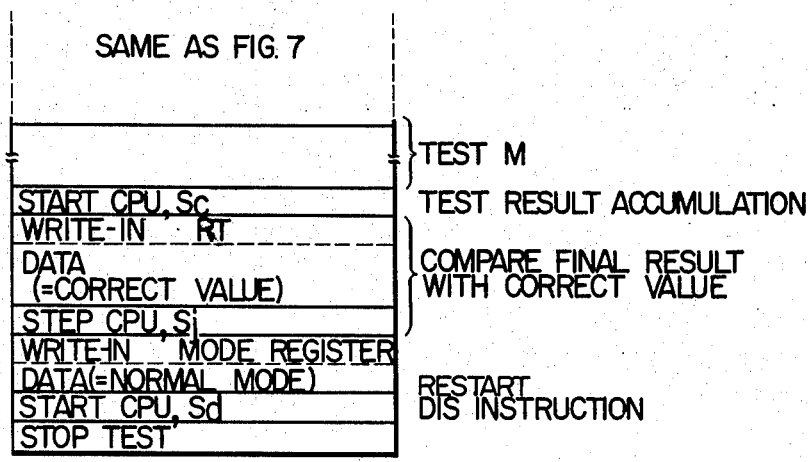

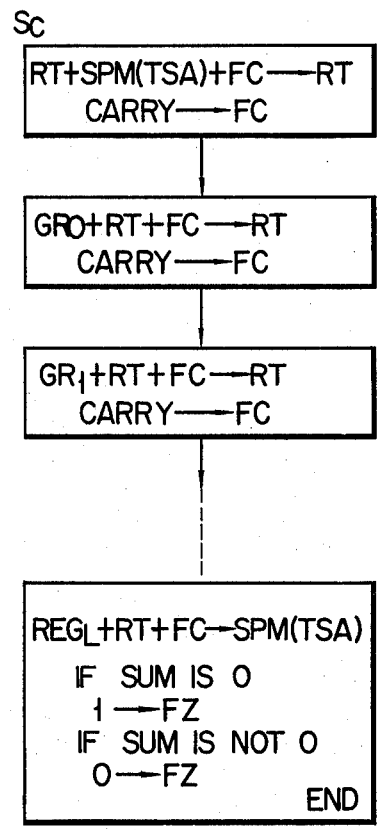
FIG. 8
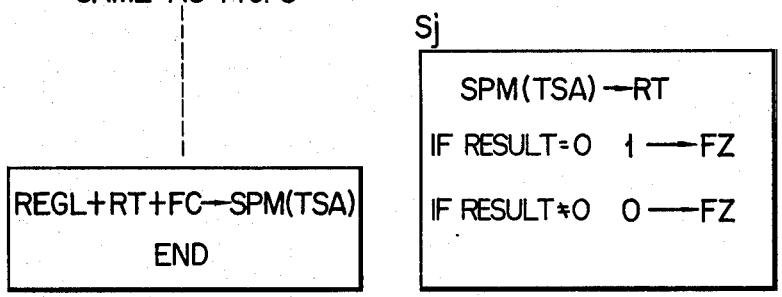
FIG. 8-A

MICROPROGRAMMED INFORMATION PROCESSING SYSTEM HAVING SELF-CHECKING FUNCTION

This is a continuation of application Ser. No. 886,828, filed Mar. 15, 1978 now abandoned.

BACKGROUND OF THE INVENTION

The present invention relates to an information processing system and, more particularly, to an information processing system with an operation verification function and a fault detecting method with an address degeneration function.

Remarkable improvements of the performances and reliability of recent information processing systems allow a single information processing system to be applied for various purposes. No matter how remarkable may be the reliability of the information processing system, it is impossible to completely eliminate faults which may occur in the system. Accordingly, as applications of information processing systems become more sophisticated and the influence of such systems becomes more widespread, it is necessary to develop improved systems for coping with rare faults of currently operating information processing system. For this purpose, means must first be provided to detect such faults.

Many technologies to detect faults have been developed. Some examples of the technologies will be enumerated below.

(1) With duplex devices or circuits, the results of processing are compared therebetween for each step of the processing to detect errors.

(2) The hardware may be designed to represent information in the system by redundant codes. The checking utilizing the redundancy is always carried out through hardware technology.

(3) Fault detection may be performed by using a test program to check the operation in the information processing system.

In the method (1), redundant hardware is provided for each apparatus and each circuit block of the system. Each redundant circuit concurrently performs the same processing. The results of each step of the processing are compared and when the results are coincident to each other, it is determined that the apparatus or the circuit is correct in operation.

Method (2) includes such techniques as checking, residue checking, one-out-of-N checking of control signals, and the like. In the case of a data transfer path such as a memory, parity checking is usable at a relatively low cost. However, it is costly when used for logical arithmetic circuits, control circuits, and the like.

Method (3) may be further varied depending on (1) the checking initiation method used by the test program, (2) the operation level of the test program, and (3) the device used for storing the test program (at ordinary times and at checking time). Typical variations of method (3) which may be used in an information processing system of the microprogram type are as follows:

(1) The checking initiation method:
  A. A method using judgment and instructions by a human.
  B. A method in which checking is automatically initiated at substantially constant intervals by using system software or a hardware timer.

(2) The operation level of the test program:
  C. Software program level (instruction level)
  D. Microprogram level (microinstruction level)

(3) The storing device used for the test program:
  E. Storing medium requiring manual operation for checking initiation such as a magnetic tape.
  F. Use of a part of a magnetic disc as a part of software.
  G. Use of a part of the memory area of the main memory.
  H. Use of a part of the memory area of a control memory.

When the device for storing the test program at ordinary time is different from that at checking time, the method is further varied by means for moving the test program for executing the checking functions.

In addition to the above mentioned fault detecting methods (1), (2) and (3), additional methods can also be listed. Such techniques include a method for processing and recording the information by redundancy provided in the software, or a method in which information processing is executed two times by different processing procedures and the results compared by software to check for fault occurrence.

As just mentioned, various fault checking methods coexist. The reason for this is that respective methods have advantages and disadvantages, and the information processing systems have different characteristics, respectively, and thus require a particular fault checking method which suits the characteristics of the information processing system to which the method is applied. Some typical reasons causing processing systems to require different fault detection methods are as follows:

(1) The time lapse from fault occurrence to fault detection.

(2) The cost of additional hardware required to detect faults.

(3) The system resources consumed by the fault detection function (memory capacity and processor time used for fault detection)

(4) The degree of fault detection accuracy required (fault detection rate)

Let us further consider the reasons (1)–(4) just mentioned in terms of fault detection method (1). In the case of this method, the time lapse till the fault detection is shortest, i.e. substantially zero. The hardware cost is highest. That is, this method takes a duplex system so that at least double the hardware is necessary, and in addition a comparing circuit is required. Processing ability is not materially reduced, although operation is slightly slower than for a comparable non-redundant system, because the two systems must run in parallel and time must be allowed for the comparing operation. The Fault detection is substantially perfect in this system.

From the above evaluation of method (1), it will be seen that this fault detection method (1) is suitable for use in systems where the erroneous information resulting from a fault can cause severe harm or damage whereupon fault occurrence is never permissible, even if its possibility is very remote.

In an information processing system used for batch processing, when a fault is detected within 10 seconds from its occurrence, sufficient time exists in which to catch the erroneous information before it goes out of the computer room. Therefore, in the case of this system, a fault detection time of up to 10 seconds is permissible. Consequently, the above fault detecting methods (2) and (3) are preferable for this type of information processing system. From the viewpoint of hardware cost, these methods are superior to method (1).

It is as a matter of course that the higher the fault detection rate, the better the system. It is very rare, however, that use of only one method attains 100% fault detection. If possible, the cost needed for realizing such is very high. A conventional way of achieving fault detection is generally a combination of two or more of the above-mentioned methods of fault detection, since the possibility of fault occurrence is extremely low. In this case, each fault detection method is evaluated in terms of the trade off between the fault between rate and the cost for fault detection. The overall fault detection rate and the overall fault detection cost of plural fault detection methods are evaluated through the trade off among the former two items, the possibility of fault occurrence, and the adverse effects resulting from erronous information which may be produced by a fault.

Various fault detecting techniques thus far developed each have a feature of its own with respect to the above four reasons (1) to (4), and these have been dominantly used at present.

SUMMARY OF THE INVENTION

Accordingly, an object of the invention is to provide an information processing system employing a fault detection method using a test program for checking the operation of the system, a memory devoted exclusively to the fault detection function in the data processing system and a control circuit also dedicated exclusively to fault detection. In an idle state of the system, the processing unit's operation is checked on basis of the instructions from the exclusive control circuit, thus improving the reliability of the processing system.

As used herein the term "exclusive", e.g., "exclusive memory", means that the memory or other designated element is restricted or dedicated in its function solely to the fault testing and checking operation.

Another object of the present invention is to provide an inexpensive fault detecting technology adopted for various information processing systems.

A further object of the present invention is to provide an information processing system in which fault detection tests are executed during the operation of the processing system with reduced memory capacity and processing time so that the system state is kept unchanged as viewed from users while initialization of the state in the system necessary for the test, i.e. the set of the test data is performed.

Still another object of the invention is to provide means to effectively execute two functions; to protect the data in the main memory during the fault detection test, and to set the test data in the main memory for the test.

Still a further object of the present invention is to provide means in which, in a system having a memory hierarchy wherein a part of the data is duplicated in a main memory, such as a buffer memory, a paging associative memory, and the like, processing during the test is systematically and simply performed without any deterioration of information processing ability.

An additional object of the invention is to provide a means to simplify the test in a processing circuit operable in a fault condition in relation with the above.

According to one aspect of the invention, there is provided an information processing system of the microprogram control type having a control storage, comprising: an exclusive fault control memory for storing commands and an exclusive fault control circuit for interpreting and executing the commands read out from said exclusive fault control memory, wherein the exclusive fault control circuit is operated when the information processing system is in an idle condition, to read a command out of said exclusive fault control memory and to have the information processing system execute a microstep or a series of microsteps specified by the command read out, thereby to check the operation of the information processing system.

According to another aspect of the present invention, there is provided an information processing system having at least two processing modes, comprising: a circuit for transferring an instruction to a main memory in the first mode, a register for holding the data to be transferred to the main memory in the first and second modes; and a circuit to read out the date held in the register in response to an instruction from the main memory in the second mode thereby making the information processing proceed, wherein, during the operation of the information processing system, the fault detection of the information processing system per se is carried out in the second mode.

BRIEF DESCRIPTION OF THE DRAWING

Other and further objects and advantages of the invention will be apparent from the following description taken in conjunction with the accompanying drawings, in which:

FIG. 4 is a flow chart illustrating the execution of a DIS instruction in the information processing system according to the invention;

FIG. 5 shows the format of a command used in the invention;

FIG. 6 is a table illustrating the kind of commands used in the invention;

FIG. 7 is an instruction listing illustrating the contents of an operation checking program resident in the exclusive memory used in the present invention;

FIG. 7-A shows a modification of the test program of FIG. 7;

FIG. 8 illustrates an example of a test result accumulation routine used in the invention;

FIG. 8-A shows a modification of the test result accumulation routine of FIG. 8 and together with a judging step;

DESCRIPTION OF THE PREFERRED EMBODIMENTS

Figure 1:
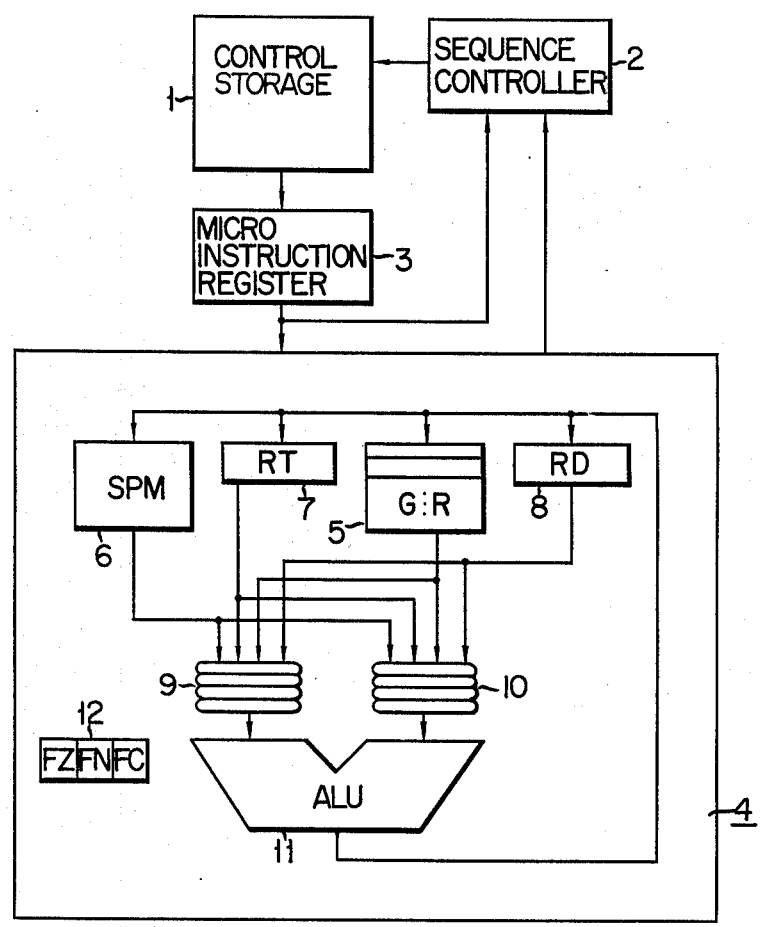
FIG. 1 is a block diagram showing a central processing unit of the microprogram control type.

A brief explanation of the invention will be given using a case where the invention is applied to a central processing unit (CPU).

A fault checking system using a test program necessarily controls an information or data processing system in order to execute a test program so that the system must have an information processing ability to enable fault checking. The present invention may be generally categorized in this manner; however, in the invention, fault checking tests are carried out while the information processing system is in an idling state, i.e. when the data processing system is not used by a user or users. Accordingly, when the data processor is viewed from the user side, little information processing time of the user is consumed by fault detection. This is one of very important features of the invention.

With respect to the above-mentioned four evaluation points for fault detection methods, the invention may be evaluated as follows:—the time taken till fault detection is satisfactorily small; the cost of hardware is relatively low; the data processing time required for fault detection is not unduly high and the fault detection rate is satisfactory.

A fault test memory is used exclusively for storing a test program. In the fault detection mode, the test program is read word by word out of the fault test memory and the words read out are sequencially executed. Accordingly, the following superflous work which is necessary in the conventional method is eliminated: before execution of the test, the test program is transferred to a part of the control storage and, after the end of the test, the control storage is restored to its original state. Additionally, since the test program is stored in the exclusive fault test memory, there is no need for providing an additional memory for storing the test program in control storage. For reduction of the memory capacity required in the exclusive fault test memory, the test program is stored in the memory not directly in the form of microinstructions but instead the memory stores only the addresses of the microinstructions (or the head microinstruction of a microroutine). This is another very important feature of the invention. In one example of the invention, the bit length of a microinstruction is 80 bits and the memory capacity of the control storage for storing the microprogram is 8 K words. The memory capacity of exclusive fault test memory need store at most only the amount of address data which is required to access up to 8 K words in the control store. Even in such a case where the microinstruction is thrown into a diagnostic command (FIG. 5) with a margin permitting the control circuit or the like to be used for other objects, it comes off with 16 bits. For example, if a test program of J steps is stored in the exclusive fault test memory in the form of a microinstruction, a memory capacity of 80×J bits is required. If a test program for addressing any microinstruction in the control store of 8 K words and executing it is stored in the exclusive fault test memory the memory capacity may be made much smaller. Thirteen bits are required to address the control store of 8 K words. With control bits added thereto, the command is expanded to sixteen bits. A diagnostic command is executed by preparing the test program as a series of commands, addressing the control store via the commands, reading out the contents (microinstructions) of the control store and executing them. By so doing, the capacity of the exclusive fault test memory for storing a test program of J steps is reduced to only 16×J bits. Therefore, the memory capacity of the exclusive fault test memory is reduced to 1/5 of that which would be necessary if the microinstructions were stored directly.

With respect to the above mentioned four evaluation points, let us consider the system of the invention in more detail. The time taken from fault occurrence to fault detection is generally several milliseconds to several hundreds of milliseconds, although it depends on the operation condition of the system used. This means that the operation checking test is possible during the idling period of the CPU as it is being readied for its succeeding processing operation. The detail of this will be described later.

Figure 3:
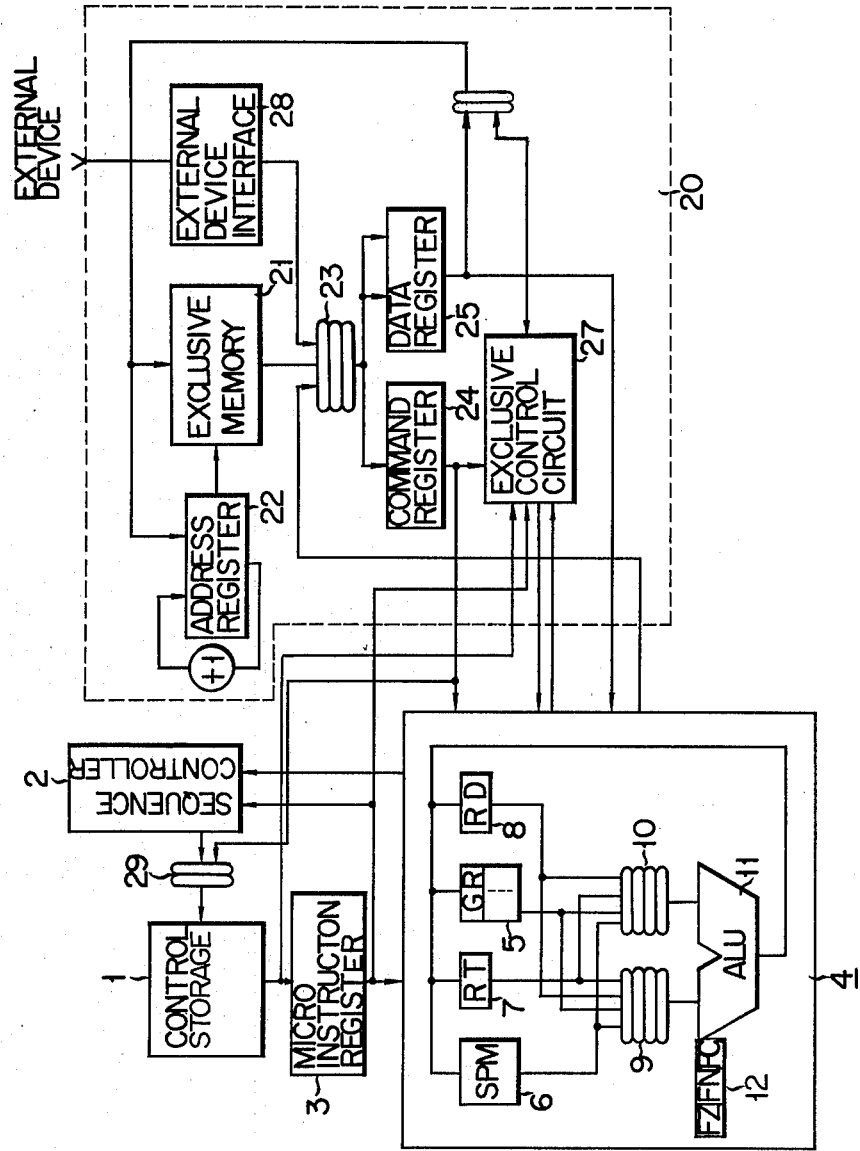
FIG. 3 is a schematic diagram illustrating the hardware construction of an information processing system according to the invention.

The hardware added for fault detection is the exclusive fault test memory and its associated address register. An additional hardware unit is the circuit for controlling the operation checking test, as shown in FIG. 3. However, diagnostic hardware other than the exclusive fault test memory and the address register may be used as the fault detection hardware.

The processing time of the CPU wasted on the fault detection function is substantially zero because fault detection is carried out during the idling time of the CPU.

The memory capacity of the control storage must be slightly increased to store a small number of microprograms for fault detection. Such programs are, for example, "a test result accumulation routine" in FIG. 8, "save general registers" "initialization routine for test", "restore general registers" routines (these routines per se are not illustrated) referred to in the flow chart of FIG. 4, the intermediate portion in the flow chart in FIG. 4 (the increased portion against a flow chart of a DIS instruction in FIG. 2), and the like. These routines are of small amount so that those may be stored by increasing only 1 to 3% of the memory capacity of the control storage, for example. Finally, the accuracy of the fault detection function depends largely on the logical structure in the hardware of the data processing system to which the invention is applied, the microinstruction, the operation checking test program written into the exclusive fault test memory, and the like. This is like a conventional fault detection method using a test program. Judging from the conventional test program and the result of the example of the invention, it is estimated that approximately 80% of the fault detection rate may be easily attained. Additionally, 95% of the fault detection rate also is possible without any difficulty.

Briefly, when the CPU enters its idling state, execution is made of the operation checking test stored in the exclusive fault test memory in such a manner as to specify the address of the control storage. Accordingly, the invention takes full advantage of the merits of the conventional fault detection technique using a test program in the microprogram level. Additionally, it eliminates many of the disadvantages of the conventional methods in which undue processing time is wasted by the fault detection and function in which the the test program needs a large amount of the memory capacity.

The following explanation describes the invention in greater detail.

Reference is made to FIG. 1 illustrating in block diagram form a central processing unit (abbreviated as CPU) to which the invention is to be applied. In the figure, the CPU shown in simplified form that the relation of it with the invention can be clearly understood. A microprogram for controlling the CPU is stored in a control store 1. A microinstruction read out from the control storage 1 in accordance with the address issued from a sequence controller 2, is loaded into a microinstruction register 3 and then used to control as an microinstruction the sequence controller 2 and other components in the CPU. One of the other components is an arithmetic unit 4. In the arithmetic unit 4, a general register GR5, a scratch pad memory SPM6, a working register RT7, and an operand register RD8 are included and these are connected to two inputs of an arithmetic logic unit ALU11, through two selectors 9 and 10, as shown. The arithmetic logic unit ALU11 is well known and performs a binary operation, a decimal operation, a logic operation, a shift, and the like. Further explanation of this will be omitted. The output of the arithmetic logic unit 11 may be again written into the general register GR5, the scratch pad memory SPM6, the working register RT7, and the operand register RD8. Reference numeral 12 indicates an indicator including a flip-flop FZ which is set when the output of the arithmetic logic unit 11 is zero, a flip-flop FN set when the ALU output is negative, and a flip-flop FC for storing a carry resulting from an addition in the logical arithmetic logic unit ALU11.

Incidentally, the general register GR5 is a general name as viewed from the software and the indicator 12 also is a register as viewed from the software and used in another control in the example of the invention to be described, too.

To the operand register RD8, is connected an input data path to set the operand read out of a main memory (not shown in the figure). The related portions in the CPU shown in FIG. 1 have transferred the information necessary for sequence control to the sequence controller 2. The sequence controller 2 determines the address of a microinstruction word to be read out on the basis of a microinstruction and the information necessary for the sequence control.

FIG. 3 shows an example when incorporating the elements of the invention into the CPU of FIG. 1.

In FIG. 3, a selector 29 is additionally provided in order that the address pertaining to of the control store 1 may be fed from a command register 24 in a circuit 20 for operation checking test as well as a sequence controller 2. In actual design, it is preferable to modify the sequence controller 2 so as to incorporate the function of the selector 29, since such is possible with little increase of the hardware. The present embodiment, however, shows the use of the additional selector 29 for brevity's sake, i.e. to avoid having to describe different sequence controllers 2 for the respective applications.

The CPU has been illustrated in FIG. 1 and described referring to it. Accordingly, in FIG. 3, like numerals and abbreviations are used to designate like blocks in FIG. 1 and the details of them will be omitted. The circuit 20 for operation checking test shown in FIG. 3 is a hardware block additionally used.

The operation checking test block 20 includes an exclusive fault test memory 21 of, for example 16 bits ×512 words and an address register 22 of 9 bits. The output of the exclusive memory 21 is coupled with a command register 24, through a selector 23. The output of the command register 24 is used to address the control store 1 and is fed as a control signal to the exclusive control circuit 27 as well. The exclusive control circuit 27 operates as a key circuit and controls the overall operation of the checking test circuit 20 and specifies the read/write operation of the register in the CPU by a control signal. The contents read out from the register in the CPU (see kind of commands in FIG. 6) is set in a data register 25, through the selector 23. Arbitrary data read out is set in the data register 25 and then may be loaded into the registers in the CPU. The data transfer between the register in the CPU and the operation checking test circuit 20 is performed through a data path.

In addition to the register in the logical arithmetic logic unit ALU11, the register in the CPU includes, for example, a mode register (not shown) selecting an operation mode (a normal mode, one instruction mode, and one step mode).

In order to use the command register 24, the data register 25, the exclusive control circuit 27, and the like in the operation checking test circuit 20 for the purpose of fault diagnosis, an external device interface 28 is provided so that a diagnostic command may be transferred from an external source to the command register 24 and the data register 25. To this end, the interface 28 is connected to the command register 24 and the data register 25, through the selector 23.

The address register 22 for the exclusive fault test memory 21 has a count-up function. Together with the register in the CPU, the exclusive memory 21 and the address register 22 are coupled with the data register 25 so as to permit it to be loaded from an external source. The above construction is used for fault diagnosis or loading the test program of the invention into the exclusive fault test memory 21.

FIG. 5 shows the format of a command word used in the invention. The command word is 16 bits in length. The command register 24 and the exclusive control circuit 27 in FIG. 3 are so designed as to accommodate the command format. The command register 24 includes 3 bits for the command field and 13 bits for the address field, which addresses the control memory up to 8K word locations, and specifies up to eight kinds of operations.

FIG. 6 tabulates the kind of commands and illustrates how the address field (13 bits) in FIG. 5 is used for the corresponding command. The command "Start CPU" denoted as the "0" command code instructs the CPU to start the execution of the microprogram from the address specified by the 13 bits of the address field. The command "Step CPU" which is of the command code "1" instructs the CPU to read out a microinstruction word from the address specified by the address field and to execute it. The difference between "Step CPU" and "Start CPU" is that the former stops the operation of the CPU when the CPU executes one step irrespective of the operation mode. This may be realized merely by transferring to the CPU a control signal forcing the mode register of the CPU to the one step mode when the exclusive control circuit 27 receives the command of "Step CPU".

The execution of the test program begins with setting the mode register at one instruction mode. Upon the setting, the command "Start CPU" starts a microprogram sequence and the microprogram is executed till an "END" microinstruction representing the end of the microroutine is accessed. At this point, the CPU halts. The exclusive control circuit 27 is so designed that, when the commands of "Start CPU" and "Step CPU" are executed, it waits to read out the next command from the exclusive fault test memory 21 until the execution of the commands ends and the CPU stops. When the exclusive control circuit 27 receives the "stop test" command (command code "2"), it stops reading commands from the exclusive memory 21 and shifts to a waiting state. Such a circuit design is easy for those skilled in the art and thus the details of this will be omitted.

The "start test" microinstruction is applied from the microinstruction register 3 (FIG. 3) to the exclusive control circuit 27. The "start test" is a microinstruction to instruct the exclusive control circuit 27 to initiate the test procedure of the invention.

The operation of the invention is hereinafter described in detail.

Figure 2:
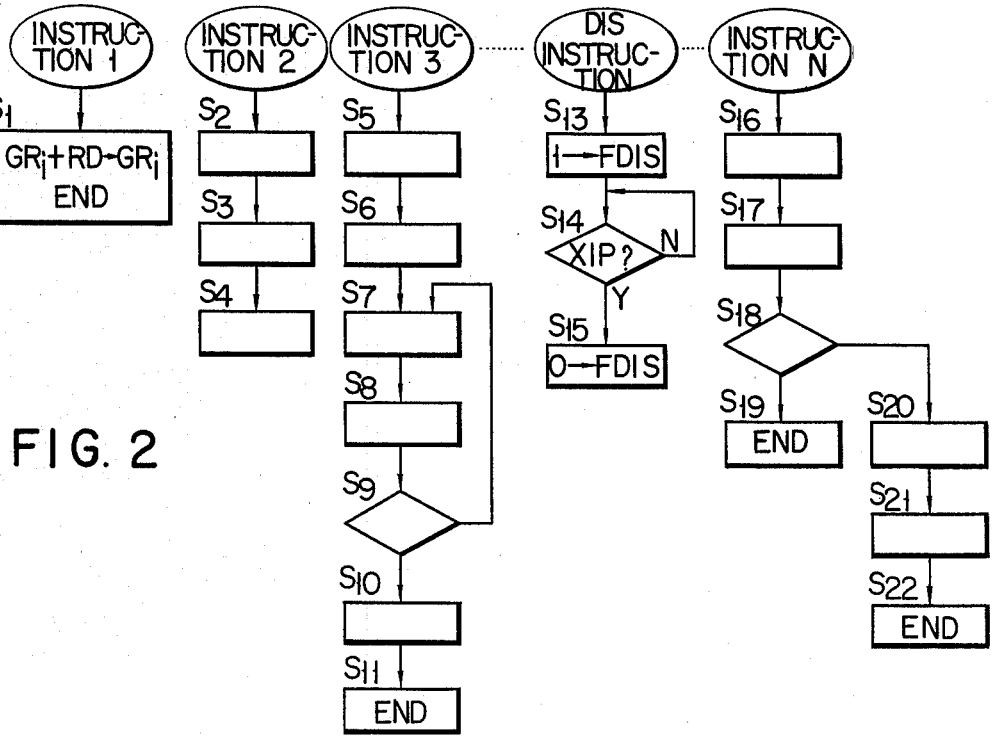
FIG. 2 illustrates a concept of the operation of a microprogram and also shows a flow chart of a DIS instruction.

The general operation of the CPU as shown in FIG. 1 will first be described by using the flow chart shown in FIG. 2. In FIG. 2, instructions 1 to N are machine instructions of the CPU when viewed from software.

When an instruction 1 is applied as a machine language code to the CPU, the sequence controller 2 decodes the instruction code portion of the machine language to produce the address $S_1$ of the control store 1 where the head address of a microprogram of an instruction 1 is stored. A microinstruction read out from the address $S_1$ of control store 1 is loaded into the microinstruction register 3. The CPU operates in accordance with the microinstruction read out. In operation, the contents of the general register $GR_i5$ and the contents of the operand register 8 are calculated (summed) by the arithmetic logic unit ALU11, and the result of the calculation is loaded again into the general register $GR_i5$. In the case of the instruction 1, the operation of the instruction 1 is entirely completed by the excution of one step of the microprogram. The microinstruction "END" is performed in the step $S_1$. The microinstruction "END" executes various operations relating to the end of the processing of the instruction word. For example, when the one instruction mode is indicated by the mode register, the microinstruction "END" causes the CPU to stop. Further, the microinstruction "END" instructs the sequence controller 2 to transfer the head address of the microprogram of the succeeding instruction word as an address to the control store 1. Accordingly, if the program is such that an instruction 3 is executed following the instruction 1, the sequence controller 2 transfers to the control store 1 the address S5 which is the head address of the microprogram corresponding to the instruction code of the next instruction word (instruction 3). In this way, the execution of a microstep S5 follows this. Thus, under control of the microprogram, microinstructions $S_5, S_6, S_7 \ldots$ in the step of the instruction 3 will be successively performed. The microprogram control itself is well known so that the illustration of the contents of individual microsteps is omitted in FIG. 2. In FIG. 2, a microprogram loop including steps $S_7, S_8$ and $S_9$ and a branch of the microprogram in a step $S_{18}$ are illustrated, as examples of the microsteps. A DIS instruction is included as one of the microinstructions.

The DIS instruction serves to place the CPU in an idling state until some signal such as an input/output interruption is fed from an external source. The system is not operated until an input/output operation is completed and the DIS instruction is executed as the job to be performed by the CPU run out. The DIS instruction is used as an initiating means of the test program of the invention (hereinafter referred to as an operation checking test program) and thus the flow of it is illustrated in FIG. 2.

When the DIS instruction is executed, the microstep of $S_{13}$ is executed as described above and the control flip-flop FDIS is set. The flip-flop FDIS is used to control an operation inherent to the DIS instruction such as control of the operation indication lamps on an operator panel and is not essential to the invention, thus specific illustration of it is omitted herein. The step $S_{14}$ of the DIS instruction is a loop for waiting for "1" of an XIP signal representing the occurrence of an input/output interruption from an external source. During the time this loop is traversed, the CPU is in an idling state. When one of the input/output operations is completed, the XIP signal becomes "1", and the operation progresses to reach the step $S_{15}$ where the flip-flop FDIS having been set at the step $S_{13}$ is reset and then the operation shifts to the processing routine of an interruption for input/output operation end. If the XIP signal is "1" when the processing one instruction is ended to produce the microinstruction "END", the shift to the interruption processing routine is also possible in a manner that the sequence controller 2 transfers the head address of the interruption processing routine in place of the head address of the microprogram of the ensuing instruction into the control store 1.

FIG. 4 shows a flow chart illustrating execution of the DIS instruction of the invention in its simplest form. The portion enclosed by a broken line in FIG. 4 is added to the flow chart of the DIS instruction shown in FIG. 2. As described above, the CPU is idle so long as the DIS instruction is executed. Therefore, as the execution of the DIS instruction is initiated, the operation checking test of the invention is executed. Operation of the DIS instruction of the invention is given below.

Entering the DIS instruction, the flip-flop FDIS is set in the step $S_{13}$, as in FIG. 2. Then, the step $S_{30}$ checks to see if the operation checking test is inhibited or not. If it is inhibited, the flow is the same as that of the DIS instruction in FIG. 2. This is for avoiding the operation checking test in order to keep an interchangeability between it and the FIG. 2 procedure in part of the diagnostic program and controls the processing after a parity error is detected in the exclusive memory 21. In other words, this is not essential. Usually, the system is not in the test inhibit mode so that the operation proceeds to the routine $S_{31}$ to save the general registers. This is a sort of the operation checking test and stores the contents of the general register GR5 into a given area of the scratch pad memory SPM6 so as to permit testing of the general register GR5 as seen from the software. In the routine $S_{31}$, the contents of the indicator 12 is also stored in the given area. Immediately following this, the operation proceeds to the initialization routine for test $S_{32}$ where the register to have a given value is initialized before the general register GR5, the working register RT7, the scratch pad memory SPM6 are partly tested. The registers initialized here include those which are included in the registers (not shown) relating to control and prefers to be initialized by a microprogram. As will subsequently be described, this example initializes the control relations by the command.

The save general registers, and initialization routine steps $S_{31}$ and $S_{32}$ are ordinarily used in the test program in the microprogram level, thus omitting the details of them.

The preparation for the initiation of the operation checking test has been completed through the above-mentioned operation. Following this, the operation proceeds to the step $S_{33}$ to produce a microinstruction "start test" to do the operation checking test. The microinstruction "start test" is transferred from the microinstruction register 3 to the exclusive control circuit 27, as shown in FIG. 3, and then initializes the exclusive control circuit 27 which has been in a waiting condition. The exclusive control circuit 27 first resets the address register 22 at zero, reads out the head address of the operation checking test program from the exclusive fault test memory 21 and loads the head address read out into the command register 24 through the selector 23.

The CPU issued the microinstruction "start test" and then stops its operation at the step $S_{34}$ as shown in the flow chart in FIG. 4. When the microinstruction includes a microinstruction to stop the CPU or when the microinstruction "start test" newly provided in the invention may include the function to stop the CPU, it is easy to stop the CPU at this point. The example is so designed that the microinstruction used for controlling the CPU has not the function to stop the CPU itself. For this, the CPU is stopped by using the command read out from the exclusive fault test memory 21. The microprogram of the DIS instruction is so constructed that it has a microstep that the operation unconditionally jumps to the address of itself after issuing the microinstruction "start test" and waits for the CPU to stop operation.

The following describes the operation checking test program shown in FIG. 7. The rest of the flow chart of the DIS instruction in FIG. 4 will be described after the explanation of the operation checking test program.

FIG. 7 shows one form of the operation test program in the exclusive memory 2 in FIG. 3. The first command read out from the exclusive memory 21 is the command "step CPU" stored in the zero address of the exclusive memory. The function of the command "step CPU" is to drive the CPU from a specified microstep and to stop it after one step execution. As described, the CPU is not yet stopped so that the first function of the command is ineffective and only the second function is effective. For this, the command is used as a means of "stop the CPU by the command".

After reading out of the command "step CPU" from the 0 address, the address register 22 is counted up, and after the execution of the command "step CPU" is completed, the command "write-in mode register" to write data into the mode designating register is read out from the first address of the exclusive memory 21. The command read out is similarly set in the command register 24. The exclusive control circuit 27 decodes the command code to acknowledge a succeession of data and then reads out the second address which is in turn loaded into the left half of the data register 25, through the selector 23. The data register 25 has a word length corresponding to two words of the exclusive memory 21. Accordingly, in the case of the ordinary "write-in mode register" command, the second address succeeding the command in the exclusive memory 21 is loaded into the data register 25. When the word length of the register 25 is longer than the data to be written thereinto, the read-out of the data is stopped by one word. The data stored in the second address is such data as to set the mode register at a specified instruction mode. Then, the exclusive control circuit 27 causes the CPU to enter the specified instruction mode, following the execution of the command in the second address.

The end of this is to cause the CPU to execute a specific microprogram routine and to prepare for stopping the CPU after the routine execution is ended, as will subsequently be described.

It is followed by a series of commands "data write-in" to initialize the register and flip-flop of control concerns for the purpose of the test. The contents of this is changeable depending on the design of the test to be conducted later and the logical construction of the information processing unit to which the invention is applied. In the CPU in the example of the invention, a number of control registers and flip-flops are concurrently reset. With such a function, an associative register address is given to the reset function and its rest function is activated by the command "data write". Such attains the simplification of the initializing procedure.

In this manner, the initialization procedure for the test has been completed. The ensuing operation is to execute the test for fault detection. The specific procedures of this test depends on the logical construction of the data processing system and the design of the operation checking test. This is easily understandable for those persons who have prepared a test program at the microprogram level. Therefore, the explanation to follow will proceed with emphasis on the basic procedures required for test execution but omitting the specific details of the test itself.

A test 1 will be referenced to the command "start CPU, $S_2$" in the address $T_{1,1}$ is read out and executed. As a result, the CPU executes the microprogram starting from the $S_2$ address of the control store 1 and finally executes the microinstruction "END", thereby to stop its operation. As seen from FIG. 2, this is equivalent to the case where the system starts from the initialized state for test and executes the instruction 2. The microprograms $S_2$ and $S_3$ of the instruction 2 take some action depending on the states of the register, memory and flip-flop in the CPU and store the results of the action. Assume now that there occurs a malfunction in the processing circuit, or the register, memory and the flip-flop (referred to as a register) exercised at this time, and the data used at this time has some condition for exhibiting the fault. The fault influences the information stored in the register to cause some change of the information. There is a possibility that the information influenced are read out in the succeeding step and stored in another register of the same register.

The objective in this step is to cause the information stored in the register or the like to change depending on the presence or absence of a fault. Therefore, the microstep series to be executed here is selected from the control store 1, from such a view point. In this manner, the microprogram proceeds to the microstep $S_4$. And as its execution is completed, the CPU in one instruction mode stops its operation. The exclusive control circuit 21 recognizes the halt of the CPU and reads out the command in the succeeding address $T_{1,2}$ (FIG. 7) and executes it. The command in this address is "step CPU, $S_8$" so that the CPU executes the fourth microstep $S_8$ of the instruction 3 by one step, as shown in FIG. 2. Then, the exclusive control circuit 21 further reads out the succeeding command "start CPU, $S_{20}$" and executes it. As a result, the CPU executes the microstep series including steps $S_{20}$, $S_{21}$ and $S_{22}$ as shown in the instruction N in FIG. 2 and then stops its operation. In this way, the respective portions in the CPU are successively driven and the results are stored in the register or the like. If necessary, further processing is continued on the information stored and the results of the processing is again stored in the register or the like. At the end of the test 1, the exclusive control circuit 21 reads out the command "start CPU, Sc" in the address $T_{1,n}$ and executes it.

Here, Sc of the command in the address in $T_{1,n}$ is the head address of the test result accumulation routine shown in FIG. 8. FIG. 8 shows one form of the test result accumulating routine and this routine is prepared for the invention. The test result accumulation routine is stored in the control store 1 together with the respective routines.

This routine aims at compressing the amount of data. More specifically, the processing results stored in various registers in the CPU are collected to assemble into one word. When there is found a processing result influenced by the fault, even if it is one, the formed one word is made different from that formed when no fault influenced result is found.

The primary object of the invention is to detect the presence of a fault rather than to obtain specific localization of the fault. In light of this, compression of the results of the test into one word, results in simplification.

The method of data compression employed in this example is to use binary addition and add a carry occurring in the addition to the least significant digit of the next binary addition.

The CPU is provided with the necessary hardware for easy performance of such multiple length arithmetic.

The result of the test is stored in a specific address (TSA) of the scratch pad memory SPM6. The memory SPM6 refuses the writing thereinto of other information than the test result accumulation routine shown in FIG. 8 at least during the operation checking test. The TSA address is initialized by the test initializing routine in FIG. 4.

When the "start CPU, Sc" step at $T_{1,n}$ of the exclusive fault test memory 21 is executed, the test result remaining in the working register RT7 and the flip-flop FC is added to the contents of the TSA address in the scratch pad memory SPM6 and the result of the addition is stored in the working register RT7 and the flip-flop FC. Then, the test result remaining in the address 00 of the general register GR5 is added to the working register RT7. At the same time, a carry occurring in the calculation of RT+SMP(TSA) is added to the register RT7, through the flip-flop FC. The result of it is again stored in the working register RT7 and the flip-flop FC. An operation similar to that mentioned above will be performed against the general register storing the test result. In this manner, the test results are compressed into one word. At the final stage, the result of the test is written into the address TSA of the scratch pad memory SPM6 so that the accumulation of the test 1 result is completed and the microinstruction "END" causes the CPU to stop. Then, the exclusive control circuit 27 reads out the command of the $T_{2,1}$ address and executes it, to initiate test 2.

At this stage, the set/reset of the flip-flop FZ has no significance and therefore the detail of it will be referred to later.

In the embodiment of the invention, the registers are initialized for the tests only just prior to test 1, rather than prior to each test, in order to reduce the amount of initialization data needed to be stored in the exclusive fault test memory 21. In the following tests, the information remaining in the respective registers in the CPU as a result of the prior test are used without any modification for execution of the succeeding test. However, it is sometimes difficult to design such a scheme. In such a case, the "data write" commands can be executed before any test which needs the registers to be preset with a specific pattern. After the test 2 is ended, the command in the $T_{2,m}$ address again executes the test result accumulation routine in FIG. 8. The result of the test 2 is added to the accumulated result of the test 1 stored in the TSA address of the scratch pad memory SPM6 and then the result of the addition is again compressed into one word which in turn is stored in the TSA address of the scratch pad memory SPM6.

In this manner, the tests shown in FIG. 7 are successively executed till the test M. In the test M, the working register RT7 is placed in an idling state. After the completion of the test M, the "data write" command is loaded into the working register RT7 the complement of "correct value of the compressed test result of all the tests". Here, the term "correct value" means the compressed test result when no fault occurs. The data to be loaded into the working register RT7 requires two words in the exclusive memory 21.

Then, the test result accumulation routine in FIG. 8 is executed. As a result, the result of all the test from test 1 to test M are compressed into one word and, when no fault occurs, the final addition result in zero. In other words, the presence or absence of a fault in the CPU is indicated by the state of the flip-flop FZ. If there is no fault, the flip-flop FZ is set.

As described above, the test M of the final test is specically treated and, in the course of the data accumulation, the complement of the correct value is added. It is for this reason that the word number of the operation checking test is intentionally reduced as small as possible.

FIG. 7A is another embodiment of the operation checking test program in the exclusive memory in FIG. 7. In this embodiment, the comparison of the test result accumulation of the tests from 1 to M with the correct value is separately treated. This method simplifies design and removes the restrictions imposed on the test M. In the case of FIG. 7A, it is unnecessary to set the flip-flop FZ at the end of the test result accumulation routine. In lieu of this, the correct value and the accumulation result are compared. If these are conicident, the flip-flop FZ is set, while if these are not coincident, a step Sj to reset it is necessary. The step Sj may be readily found in the microprogram to execute an instruction. FIG. 8A shows the test result accumulation routine and a comparing step in comformity with that in FIG. 7A.

The fault detection has now been substantially completed. The explanation to follow is the post-processing of the operation checking test. Reference is made to FIG. 7.

The mode register of which the mode has been in one instruction mode for the test is restored to a normal mode. To this end, the "data write" command and then the "start CPU, Sd" command are executed. The step Sd is the address of the microinstruction depicted in the flow chart in FIG. 4 so as to be executed following the step $S_{34}$. When the "start CPU, Sd" command is executed, the microprogram of the DIS instruction shown in FIG. 4 which has been interrupted in its execution, is executed again. The exclusive control circuit 27 decodes the "stop test" command following the "start CPU, Sd" command and then stops the reading-out of the exclusive memory 21 to be in waiting condition.

In this manner, the microprogram in the CPU restarts its execution from the step $S_{35}$ in the Sd address in FIG. 4. The first to execute is to test the flip-flop FZ. If the flip-flop FZ is zero, it means that fault is detected, as mentioned above. Accordingly, it proceeds to an exception processing routine where an abnormal occurrence is noticed as in exception processing. When the flip-flop FZ is set, the step $S_{36}$ in FIG. 4 is executed. That is, the contents of the general register GR5 shunted in the scratch pad memory SPM6 is read out to restore the general register GR5 and the indicator 12 to their original states. In this manner, the post-processing of the operation checking test has completely finished. Then, the CPU enters into a loop waiting for the input/output interruption signal, as in the case of the conventional DIS instruction.

In the above, we have presented the operation of the embodiment in which the invention is applied to the CPU, in a simplified form. We will further supplementarily explain the operation checking test and test result accumulation routine.

As seen from the FIG. 7 instruction listing, the operation checking test routine executes some steps and then accumulates the test result. The reason why the test result is not accumulated once for each execution step is as follows:

(1) When the commands to execute the test result accumulation routine are increased in number, the overhead is increased from the viewpoint of the test time required and the word number in the exclusive memory.

(2) In the test result accumulation routine, it is generally impossible to store the contents of all the registers. For this, a microinstruction or microinstruction trains are executed. Then, with respect to information stored in the registers which are not available to the accumulation routine, another microstep or other microstep trains are executed thereby continuing the processing, so that such information is entered into a register which is available to the accumulation routine. Then, the accumulation subroutine of the test result is executed.

(3) Usually, if a train of one microstep is executed, the result of the processing is loaded into only a part of the registers available to the accumulation routine. For this, a microstep or a microstep train is executed to load the processing result into different registers. In this manner, the processing result is loaded into the most possible registers. Then, the test result accumulation routine is executed. The result permits the test to be efficiently conducted.

The test result accumulation routine shown in FIG. 8 uses a binary addition operation in which a carry is returned to the least significant digit. Superfluous care is not necessary about the fact that the same processing result is accumulated plural time except rare cases.

When an exclusive OR circuit is used in place of the binary addition, the operation checking test must be carefully designed so as not to accumulate the same processing result even times. In the binary addition operation depicted in FIG. 8, care must be taken not to accumulate the processing result to be accumulated and its complement as well. Otherwise, the fault effect included in the processing result is neutralized so that the fault effect will not be embodied in the accumulated result. It is of no concern that a fault influences a plurality of processing results. Nevertheless, in the case of such a fault which complementarily effects two processing results, no fault result will appear in the accumulation result.

When it is difficult to avoid such a complemental problem in the operation checking test design, the test result accumulation routine is modified and addition is made after the accumulation result up to that time is rotate-shifted. That is, sophisticated data compression techniques are employed for solving such a problem.

In the example of the invention, with the intention of reducing the amount of data in the exclusive fault test memory, fault checking is not made for each test unit in order that each test unit does not need to have the correct value. If necessary, however, the operation checking test may be designed so that the accumulation result is zero for each test unit. Alternately, each test unit has its correct value and the fault presence is judged at the end of the test result accumulation routine.

The present invention is effective when it is used to detect faults in portions of the system where an effective parity check is impossible, such as arithmetic circuits, control circuits and the like. On the other hand, the register file, memory and its associated data bus are susceptible to effective fault detection by using a hardware redundancy check such as a parity check. Accordingly, a data processing system to be fault-checked is divided into two parts; one is fault-checked by using a redundancy check, and the other by the operation of the checking test method of the invention. If so arranged in fault checking, the amount of testing to be done by the operation checking test is reduced and thus the memory capacity of the exclusive memory may also be reduced. Incidentally, in this case, the fault detection method of the invention is applied to the interface with the former i.e. to which the conventional redundancy check is applied.

For example, in such a case where a number of registers are collected by using an integrated circuit of the register file, if the operation checking test is applied to each register, the extent of the test function is increased. The following measures, however, may reduce the test function. The hardware is so designed that parity checking is applied to the register file and its associated data buses. The operation checking test of the invention takes charge of fault-checking the addressing circuits of the register file and the data circuits contiguous with the portion parity-checked.

In the thus far mentioned example, the object to be checked by the invention is the arithmetic logic unit which may be directly controlled by the microinstruction. However, the invention is also applicable for the hardwired control portion in the CPU. This will be given below.

The hardware construction shown in FIG. 3 has in the sequence controller 2 a hardwired control circuit which performs an operation wherein the instruction code of an instruction word to be next executed is decoded, the head address of the microprogram of the instruction is prepared and a microinstruction "END" is waited. The following procedure is necessary for testing the hardwired control circuit.

1. An instruction word is loaded into a register receiving the instruction to be next executed by the command "data write".
2. Some test of the arithmetic logic unit is conducted by the command "step CPU". At this time, the respective portions in the hardwired control simultaneously operate by one step so that the head address of the microprogram of the instruction is loaded into a register.
3. It is necessary to execute a step to transfer the contents in that register into a register as seen from the accumulation routine. That is, the register and the like are set for test and the CPU is driven by necessary steps. In this way, the test may be conducted.

The explanation to follow is how long it takes from the fault occurrence to the fault detection.

The time required from the fault occurrence to the fault detection basically depends on the frequency of the input/output interruptions of the CPU because of the nature of the operation checking test of the invention. The frequency of the input/output interruption greatly changes depending on various factors such as the nature and amount of the data processing conducted by the CPU to which the invention is applied, the kind of information processing system to which the such CPU is applied, etc. Further, even in a single system, it changes from moment to moment. For this reason, we have conducted a research of the frequency of the CPU's input/output interruptions under various load conditions for several systems, before the invention is applied. The result of the research showed that, even if there are many jobs near the CPU bound, the CPU is placed in the input/output wait mode once every several hundred milli-seconds. Further, it was found that there is a great difference among the waiting times for disc seeking or data transfer, new job incoming, and operator's action. This is true in the restrictive case of more than 1 milli-second input/output waiting. Consequently, when the invention is applied to an information processing system, the operation checking test may be conducted once every several hundreds milli-seconds. The time taken from the fault occurrence to the fault detection in the invention is thus much shorter than that of a conventional system.

However, it is expected that this value largely changes based on the type of information processing system to which the invention is applied. Therefore, when the invention is applied, it is necessary to conduct the above-mentioned research for every system.

Various modifications of the invention will be given.

A first modification is such that, in the FIG. 4 case of the DIS instruction flow chart, the test initializing routine $S_{32}$ is performed only one time before the operation checking test. Although depending on the logical construction of the data processing system or the design of the operation checking test, there is a case where it is desired to execute the test initializing routine $S_{32}$ assembled by the microprogram before the beginning of each test 1 to M shown in FIG. 7. In this case, the test initializing routine is separated from the flow chart in FIG. 4, and independently treated as shown in FIG. 8. It is altered so as to produce the microinstruction "END" as the final microstep. And the command "start CPU" is added to the head of each test 1 to M of the operation checking test program in FIG. 7, so as to specify the head address of the independent test initializing routine. The saving restoration routine of the general register may be separated, which will be described later referring to FIG. 9.

A second embodiment is described below. For simplication of the hardware, the FIG. 7 embodiment is so constructed that the end of the microstep train specified is detected by using one instruction mode already existed to stop the CPU. In some programs of the data processing system to which the invention is applied, it is difficult to utilize the microstep trains shown in FIG. 7. Further, for mere execution of the microstep trains or a signal microstep, there is a case where the test design is difficult. In such a case, it is preferable to use a command such as "the CPU is started from the specified microstep, and, after the steps of the specified number are executed, the CPU is stopped". The specified number of steps are usually 2 to 3 steps to 5 to 6 steps. Accordingly, the command format shown in FIG. 5 is modified to have a counter field of about three bits. In this case, it is easy to design such a construction that a counter is provided in the exclusive control circuit 27, and a stop signal given after the steps specified by the 3 bits are executed in the CPU, is transferred to the CPU.

A third modification is described as follows.

In the FIG. 2 example, the DIS instruction (shown in FIG. 4) is used corresponding to a state that the CPU waits for an input/output interruption. Therefore, it is easy to detect the input/output interruption waiting of the CPU. There is another type data processing system in which the DIS instruction is not used and the interruption is produced by using a program loop. In such a data processing system, the hardware or the system software is modified so that the hardware recognizes that the CPU is in input/output interruption waiting state, by using an additional instruction code or unused bits in the instruction word. The modification varies depending on the system used.

A fourth embodiment will now be given.

This modification can not detect a fault that the flip-flop FZ is always "1". The fault detection rate is improved when, after the step $S_{35}$ in FIG. 4, a test to check whether the flip-flop FZ is reset is used before the restoration of the general register.

The above examples illustrate the invention as applied in the most fundamental form. With respect to the fault detection rate, a satisfactory result can be achieved by using such fundamental applications. However, the points required for the fault detection and its importance are different for every case. For employing with a wide variety of requirements, one of the following examples or a proper combination of two or more of them is advisable. Other embodiments will be described hereinafter.

In the above-mentioned embodiment, the operation checking test is executed when the CPU is in the input-/output waiting state, or the idling state. Therefore, there is not a fixed upper limit of time required from the fault occurrence to the fault detection, although it is sufficiently short. Some data processing systems have a requirement of calling for execution of the operation checking test once every second irrespective of the resulting 0.1% reduction in data processing performance.

Figure 9:
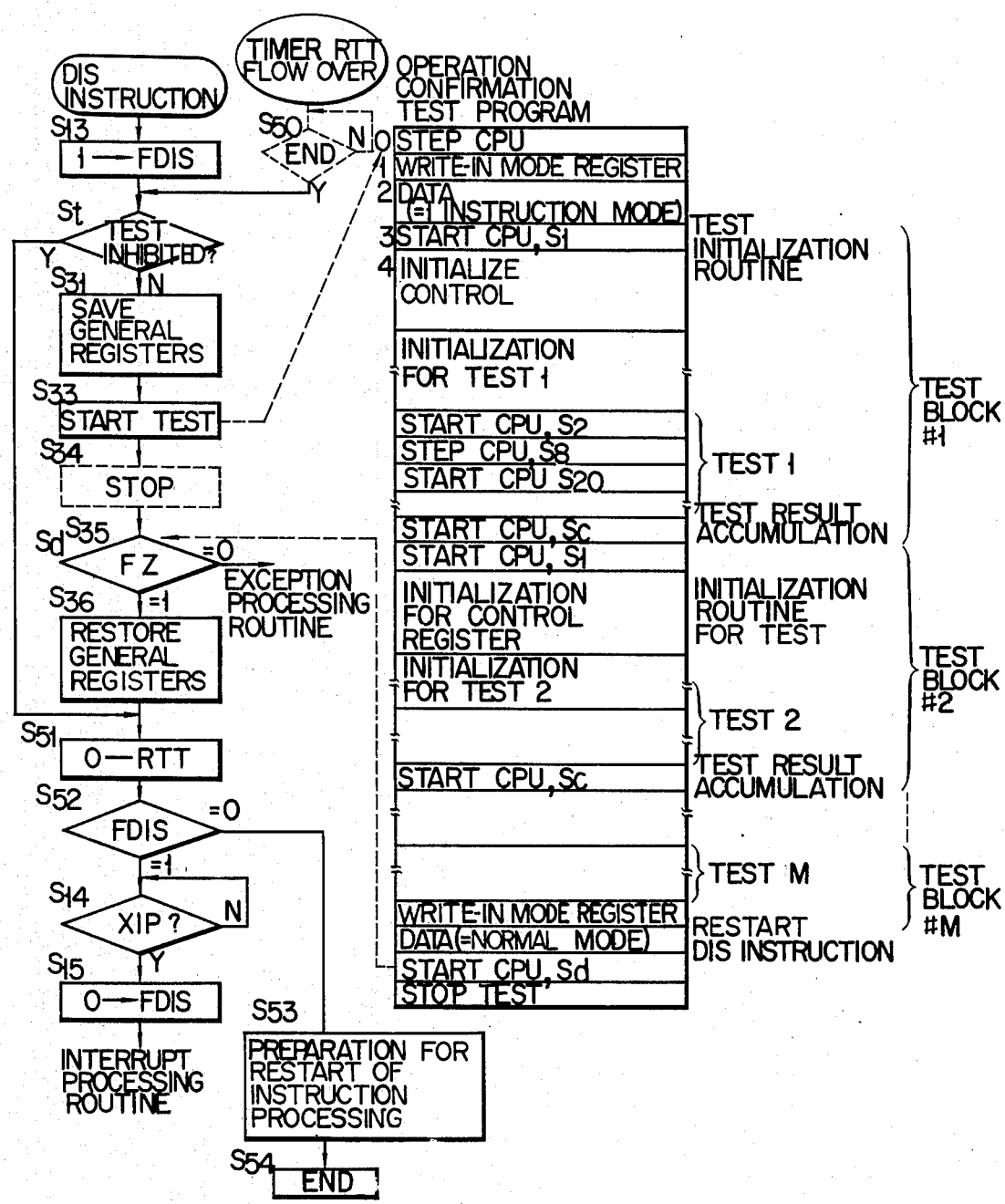
FIG. 9 is a flow chart showing another embodiment of the invention in which a DIS instruction with a lower limit of an execution frequency of the operation checking test and a program for controlling the operation of a checking test are employed.

An example where the lower limit of the execution frequency of the operation checking test must be set up, will be given below. The flow chart of the DIS instruction and the operation checking test of the example is shown in FIG. 9; however, the hardware is not illustrated because of its minor change. In this example, an additional counter RTT is provided in the exclusive control circuit in FIG. 2 and to the counter RTT is applied a count pulse from a timer in the CPU. In the system to which the example is applied, the bit length of the counter RTT is selected to such an extent that, when the count pulse from the timer are continuously applied for one second, it overflows.

The overflow signal of the counter RTT is applied to the sequence controller 2. The sequence controller 2 has a function "in the presence of the XIP signal (input/output interruption signal), when the microinstruction "END" is issued, the address of the head address of the interruption processing routine is transferred to the control storage 1, in place of the address of the head address of the microprogram of the ensuing instruction". The function is extended such that in the presence of the overflow signal of the counter RTT, when the microinstruction "END" is issued, the address St is transferred to the control storage 1. The address St is shown in FIG. 9.

The FIG. 9 embodiment is that the first modification and the example with the lower limit of the frequency of the operation checking test execution are added to the above-mentioned embodiment. In FIG. 9, there are shown flow charts of the microprogram of the DIS instruction and the operation checking test. The address St is the head address of the routine to initiate the operation checking test, as shown in the DIS instruction flow chart in FIG. 9. An explanation will be given emphasizing the difference from the test program described in connection with FIGS. 4 to 7. In addition to the conventional DIS instruction execution, when the processing of the instructions is finished and the microinstruction "END" is issed, the sequence controller 2 causes the routine starting from the step St to be executed. A means having such a function is newly provided for the entrance of the microprogram flow chart of the DIS instruction. The loop $S_{50}$ waiting for the microinstruction "END" is executed by the hardware of the sequence controller 2. This does not exist in the form of hardware so that it is illustrated by a broken line.

The initialization routine for test $S_{32}$ executed following the saving step $S_{31}$ of the general register GR5 shown in FIG. 4 was modified into an independent routine (not shown) by the first modification. The head address of it is St. Accordingly, the step $S_{33}$ to produce the microinstruction "start test" immediately follows the saving step $S_{31}$ of the general register, in FIG. 9. In the test initializing routine, the command "start CPU, $S_1$" is issued prior to the respective tests in the operation checking test program. When the test initializing routine prior to the respective tests in the operation checking test, the test, and the accumulation of the test results are collected into a test block, the structure of the operation checking test is simplified.

After the completion of the operation checking test, the restoration step $S_{36}$ of the general register GR5 and the indicator 12 is executed and the counter RTT is cleared to zero at the step $S_{51}$. As a result, the time elapse after the operation checking test is executed is counted by the counter RTT. And if the input/output waiting state occurs within a given time and the operation checking test is executed, the counter RTT is cleared again to zero at that time.

The operation when one or more input/output waiting states occur in a given time is like the example of the fundamental form described previously. It enables the operation checking test to be done without using computer time allocated for users.

Only when the input/output waiting state does not occur in a given time, the overflow of the counter RTT takes place and the operation checking test is conducted keeping the processing of the user instruction to be executed waiting.

When the operation checking test is conducted after the DIS instruction is executed, the flip-flop FDIS is set at "1" so that, after the counter FTT is cleared zero at the step $S_{51}$, it enters the loop for input/output interruption waiting. See $S_{14}$. When the operation checking test is executed after the RTT overflow, the flip-flop FDIS is reset to "0" so that, after the counter RTT is cleared to zero, the processing of the ensuing instruction will be immediately restarted without waiting for the input/output interruption.

In the example of the invention, since the operation checking test is conducted, the registers concerning the control (visible to the software) are destroyed. For this, the routine for restoring these registers to their original states is executed before the processing of the next instruction starts in response to the microinstruction "END". In FIG. 9, the step $S_{53}$ of preparation for restart of instruction reprocessing and the step $S_{54}$ of END are illustrated.

When it enters from the DIS instruction, the next instruction of the DIS instruction is not immediately executed but it necessarily goes to the interruption routine. Therefore, it is unnecessary to execute the routine of preparation for instruction word reprocessing operation. In FIG. 9, the control shift between the microprogram of the DIS instruction and the operation checking test program is indicated by a broken line.

The DIS instruction is the one executed only in the master mode. Therefore, it has been not problematic in the explanation thus far mentioned. Before and after the operation checking test, the distinction of the master/slave must save and restore as a part of the general register or the indicator. The reason why such is done is there is a case it enters the operation checking test from the slave mode. To this end, the registers and the like representing the master/slave is designed as a separate one from the mode register for setting the one-instruction mode.

The embodiment to follow is the case requiring a short interruption response time.

In the simplest example shown in FIG. 4, as it enters the DIS instruction, the operation checking test is first performed and then it enters the interruption waiting loop. Therefore, if the interruption occurs immediately after it enters the DIS instruction, the interruption is kept waiting for the time required for the operation checking test execution. Accordingly, the computer time for users is consumed, and the response time for the interruption is elongated by the time corresponding to the execution time of the operation checking test.

Such a disadvantage is considerably improved by provision of a new timer for setting up the upper limit of the frequency of the execution of the operation checking test, as mentioned referring to FIG. 9. Every time the operation checking test is executed, the timer is cleared. At the same time, a newly provided test control flip-flop is set. If the timer is overflowed, the test is inhibited (one of the branching condition in the flow chart in FIG. 4) so long as the test control flip-flop is set. That is, in this manner, the operation checking test is prevented from being executed in an unnecessarily complex manner.

However, the method of FIG. 9 can not overcome the disadvantage of elongation of the response time for the interruption. Only the effect of the FIG. 9 method is reduction of a possibility of the disadvantage occurrence.

A modification to be given eliminates the elongation of the response time for the interruption due to the operation checking test. In the modification, the operation checking test is interrupted immediately after an input/output request occurs.

The above-mentioned research of CPU operation shows that the idling states occurs with a satisfactory frequency even when the idling states continuing for one or more second alone are counted. This means that when the idling state terminates in a short time, if the operation checking test is interrupted, there arises no problem.

First, the XIP signal is applied to the exclusive control circuit 27, too. The exclusive control circuit 27 so controls as to read out the command from the specified address of the exclusive memory 21 irrespective of the address of the same memory read out finally, when the XIP signal comes in during the operation checking test execution. The command operation is such that the mode register is restored to its normal mode, the CPU is started from the specified address (Sr address) of the control storage 1 and then the exclusive control circuit 27 is placed in the waiting condition, like the final four words of the operation checking test program shown in FIG. 7. In the microprogram starting from the specified address Sr, the general register is restored and the flip-flop FDIS is reset and then the operation proceeds to the input/output interruption processing routine.

In the example of FIG. 4, the head address of the restoration routine $S_{36}$ of the general register is designated Sr. However, when this modification is made to the FIG. 9 example, after the restoration of the general register, the counter RTT is left as it is without zero-clearing and the operation proceeds to the interruption waiting loop $S_{14}$ or the routine of the preparation for restart of instruction reprocessing $S_{53}$, for the microprogram succeeding to the Sr address.

When the CPU is started from the Sr address, the operation checking test has not yet completed so that it is impossible to judge whether there is fault or not.

An example in which the above-mentioned modification and another modification are employed will be described later.

An explanation will be given of an embodiment in which the operation checking test is initiated from the software. As described above, the fault detection method of the invention performs the fault detection for a short time, for example, one second. Therefore, the fault detection method of the invention is applicable for batch processing systems and most on-line data processing systems as well.

However, in some on-line data processing systems, there is a case where, when erroneous information is once transferred to a terminal equipment, if a fault is detected immediately after the transferring, it is difficult to cancel the effects by the erroneous information, as the note issuing against many and unspecified persons. Such a case, however, is at most one time a second, for example, for data processing systems, since important information of which the reprocessing is difficult is one time to one transaction. When the program approaches such an important point, the program drives the operation checking test to check to see whether the data processing system operates normally or not, and then such important information is transferred to the terminal. Such a method is desirable because, if a fault occurs, the scope to be reprocessed is restricted.

There is a system for making a request for and a renewal of the data base in which a transaction file for a check point file and recovery is provided and reprocessing is possible when a fault occurs. If the system is so constructed that, before the check point file is prepared, the operation checking test is driven by a program to see if the data processing system is correct or not in operation, the procedure for restoration when a fault is detected is clear and simple.

In such a case, it is easy that a new instruction code is provided or one of the already existing instructions is used, and the operation enters into the flow chart in FIG. 4 by the instruction of the software instruction. In this case, however, if the test is inhibited, it is preferable to turn it to the exception processing routine as an abnormal condition and not to terminate it directly, as in the FIG. 4 or 9 examples.

After the restoration of the general register, a means for searching the FDIS, for example, determines the end of the operation checking test driven from the software and the operation proceeds to the processing of the next instruction without turning to the input/output waiting routine. The above operation is necessary. An embodiment to be given employs the above modification together with another modification.

Figure 10:
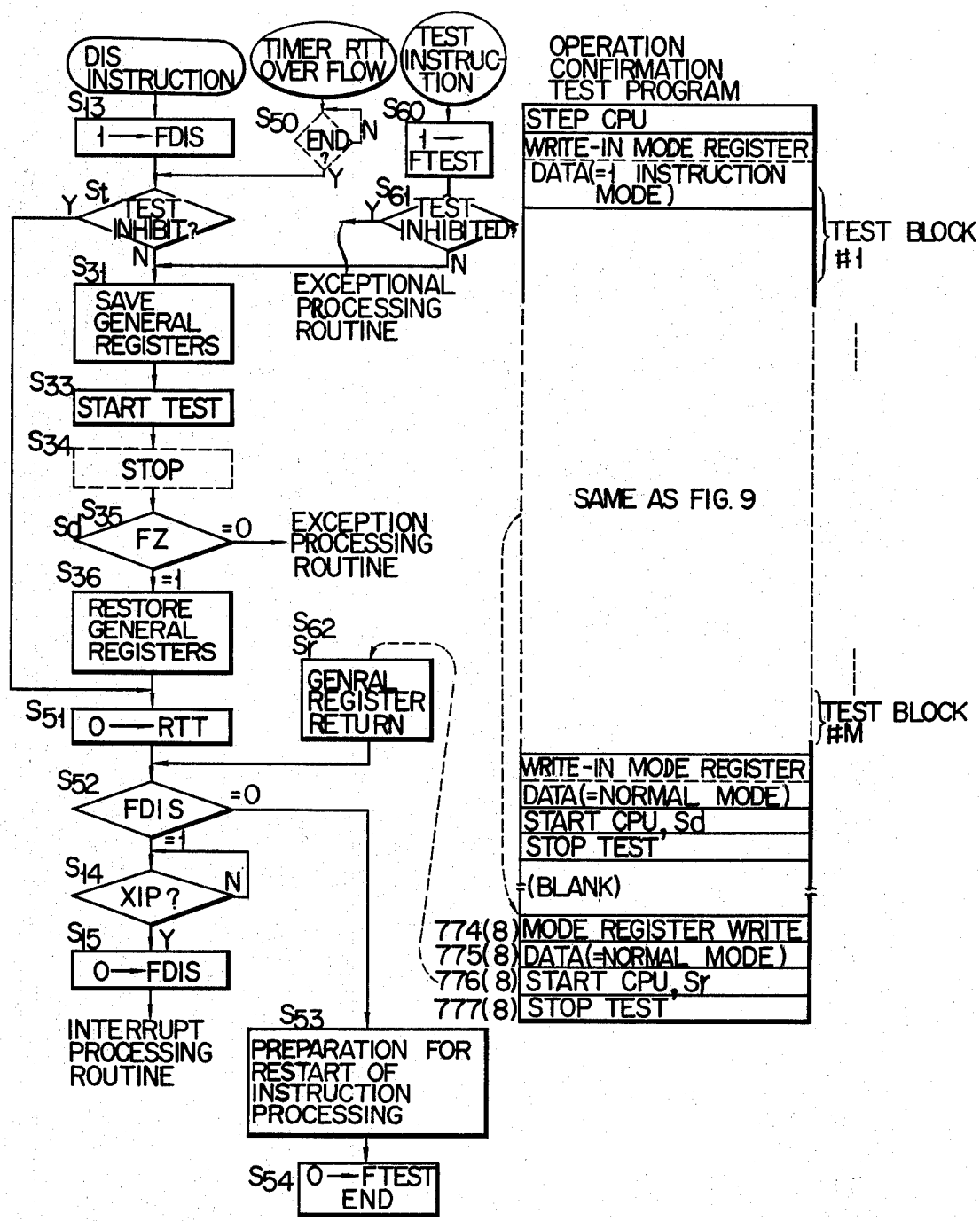
FIG. 10 shows still another embodiment of the invention in which a flow chart of a DIS instruction and a program for controlling operation of a checking test are illustrated.

In the embodiment shown in FIG. 10, the lower limit of the frequency of the execution of the operation checking test is set up. The embodiment is so constructed as not to elongate the response time for the interruption request by the operation checking test and to execute the operation checking test by the software instruction. The explanation of the embodiment to be given emphasizes the differences from the examples of FIGS. 9 and 10 and the portions not illustrated therein.

In the FIG. 10 embodiment, an instruction "TEST" is provided to initiate the operation checking test by using an empty period of the conventional instruction code.

When this instruction is executed, the step $S_{60}$ sets the flip-flop FTEST. The function of the FTEST will be described later. Then, a check is made to see if the test is inhibited or not at the step $S_{61}$. If it is in the test inhibited mode by reason of occurrence of a parity error in the exclusive memory, it is impossible to do the job expected by the software, and therefore it shifts to the exception processing routine. Usually, after shunting the general register, the indicator, and the master/slave distinction, if the operation checking test is initiated. The operation checking test is the same as that of FIG. 9 except that the post-processing commands as shown in FIG. 10 are added to the addresses 774(8) to 777(8) of the exclusive fault test memory 21, as shown as the operation checking test program in FIG. 10. The exclusive control circuit 27 is slightly changed and when the XIP signal comes in during the operation checking test, it forces an address 774(8) into the address register 22 of the exclusive memory 21. This function of the control circuit interrupts the execution of the operation checking test. When the flip-flop FTEST is set, the function is not effective and all of the operation checking tests initiated from the software are necessarily conducted.

When it is in the input/output interruption waiting mode or the counter RTT overflows, the operation checking test is initiated. When the XIP signal becomes "1" during its test execution, the exclusive control circuit 27 reads out the next command from the address 774(8) of the exclusive memory 21. The control circuit 27 further executes the commands in the addresses 775(8) and 776(8) so that it immediately restores the CPU to the normal mode and causes it to execute the microprogram from the Sr address. The microprogram starting from the address Sr performs the same job as that of the general register restoring routine $S_{36}$ mentioned in the examples thus far described.

FIG. 10 illustrates as if the same routines coexist for simplicity. In fact, however, since the general register restoring routine is called by the subroutine call in the microprogram level, the routine starting from the address Sr comes off with only one step $S_{62}$. After the restoration of the general register is completed, it immediately proceeds to the step $S_{52}$ to test the flip-flop FDIS without zero-clearing the counter RTT.

Let us consider a case where the operation checking test initiated by the overflow of the counter RTT is interrupted by an input/output interruption. After restoration of the general register, it prepares for restart of the instruction word processing and proceeds to the step $S_{54}$ to produce the microinstruction "END" where the sequence controller 2 causes it to shift to the interruption processing routine.

The microstep $S_{54}$ to produce "END" is executed when the operation checking test initiated by the test instruction confirms that there is no fault and it normally terminates. Therefore, the job for resetting the flip-flop FTST also is conducted.

As described above, according to the invention, the bit length of the exclusive memory is short so that an economical fault detection method is provided. Additionally, the fault detection is made in the microinstruction level and thus a minute detection may be effectively performed. The time taken from the occurrence of a fault to the fault detection is sufficiently short with little comsumption of computer user time. Furthermore, since the test items are stored in the exclusive memory, application of the invention has little effect on the memory contents (software) of the main memory. The invention may be applied to the information processing system of the microprogram type or the case including the portion by hardware control. Additionally, the invention is applicable for fault detection in the control circuits and the arithmetic circuits not readily susceptible to the application of parity checking.

Technique for Memory Interface Hardware Verification

Before an operation check test routine is initiated, the contents of a register or a memory under test are usually saved in the scratch pad memory. However, the number of words which can be stored in a scratch pad memory is not infinite. The entire contents of a main memory can never be saved in the scratch pad memory, even if the main memory is to be involved in the test. Therefore, several predetermined words in the main memory can be shunted, saved and used for the test. For this, one or several specific words in the main memory is previously selected for the test and such specific word alone is shunted for protection of the memory contents. In other prior art systems to protect the main memory, the portion relating to the main memory is excluded from the object of testing or the main memory interface is locked by the hardware during the test. When such main memory protective method is used, the results of the reading-out of the main memory are (i) error, (ii) as if a fixed value (e.g. zero) is read out, and (iii) the contents of it of final reading or writing. The results take such a variation depending on the methods of the memory protection.

The disadvantage of the above method is that the address can not be freely specified for the test and thus the test execution is restrictive. If the test is conducted without using the main memory, the portions not tested remain around the main memory. In the data processing system of which the details are controlled by the microprogram, the untested portions are small therefore providing no problem. However, when large job units are instructed by the microinstruction and the rest is controlled by the hardware and, with such, the main memory is accessed, there is a possibility that larger portions are left untested. This is problematic.

The disadvantage of the protective method to lock the main memory interface resides in that "a state that the main memory normally operates to permit a free reading or writing for testing the respective portions of the data processing system" can not be freely simulated.

Before the test, it is necessary to set the test data.

This will be described by using a test that an operation "the contents of the address 100 of the main memory is added to a register A" is performed and the result of its operation is studied to see if the adder, register, and its peripheral circuits properly operate or not. In this case, the contents of the register A and the 100 address of the main memory must be set up at predetermined values before the test. By convention, the contents of the 100 address is once shunted and then the test data is loaded into the 100 address before the test. In the memory hierarchy system having a duplication of the main memory such as a buffer memory, if the contents of the buffer memory is destroyed to make the memory contents empty when the test is conducted, it properly operates from a logical viewpoint.

However, destruction of the memory contents is undesirable because it deteriorates the efficiency of data processing by the user performed after the test. For this reason, the contents of the buffer memory as well as the main memory has been shunted.

Accordingly, the invention is to provide a data processing system with an address degeneration function in which the memory capacity of each memory for the test of fault detection performed during the system operation is reduced and the time required for the test is shortened, as described in the third and sixth objects of the invention.

The invention effectively performs two functions to protect the data in the main memory necessary for the test during the operation and to set the test data in the main memory for the test. Further, in a system of a memory hierarchy having a duplication of a part of the data in a main memory, such as a buffer memory, a paging associative memory, and the like, the processing during the test may be systematically and simply performed without any deterioration of the information processing ability.

An information processing system with an adddress degeneration function of the invention will be described with reference to FIGS. 11 to 15.

Figure 11:
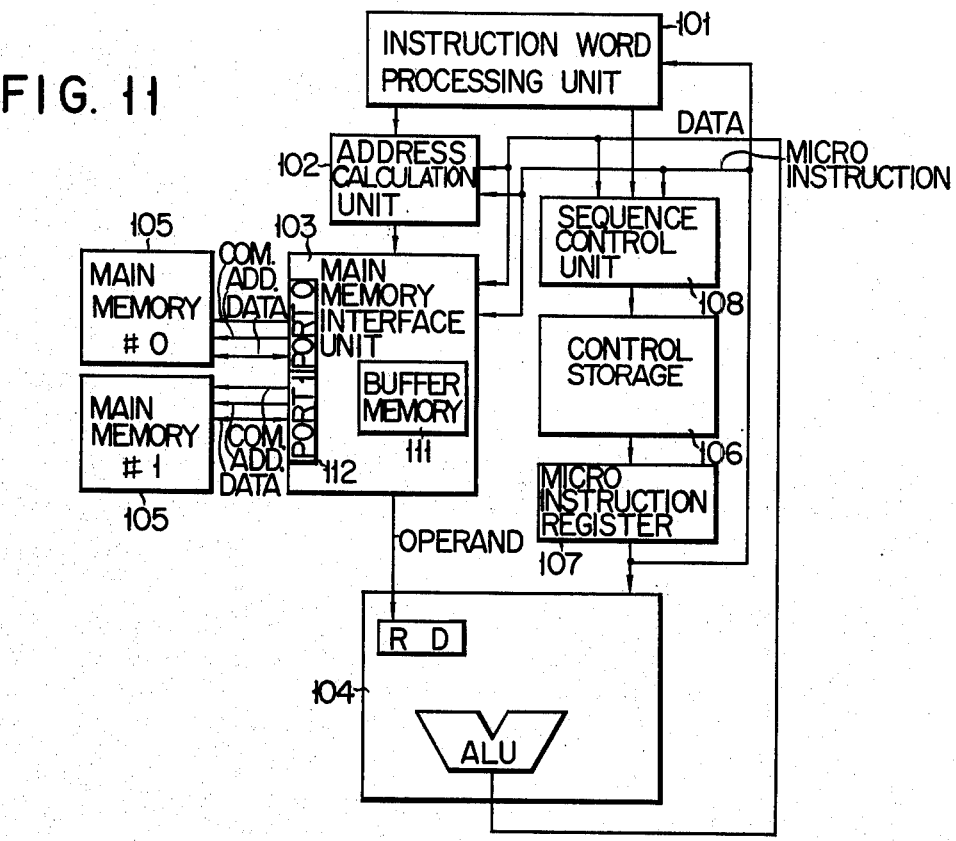
FIG. 11 is a schematic block diagram illustrating an information processing system with an address degeneration function.

FIG. 11 shows a block diagram of a major portion of the central processing unit of the information processing system with the address degeneration function.

In FIG. 11, the instruction processing unit 101 successively reads out instructions to be executed and decodes them and causes an address calculating unit 102 to count the operand address. The operand address from the address counting unit is transferred to a main memory interface unit 103 to read out the operand from the address of the main memory 105. The operand read out is loaded into the operand register RD in the counting unit 104. The construction of the counting unit 104 is not essential to the invention, and is not illustrated. However, in order to symbolically express the data inputs and outputs, the operand register RD and the arithmetic logical unit ALU are illustrated.

The main memory interface unit 103 may have a buffer memory 111 or does not need to have it. The interface 103 has section 112 called a port 112. The port 112 is used, one for one, for the main memory, but is not limited to two in number. In the CPU shown in FIG. 11, a system control unit is inserted between the port 112 and the main memory 105. The system control unit performs a multiprocessing of a main memory access request from the respective units. In fact, the port is provided correspondingly to the system control unit. The system control unit is not essential to the invention and thus is not illustrated in the figure.

The CPU in FIG. 11 is of the microprogram control type. It has a microinstruction register 107 for receiving a microinstruction from a control memory unit 106. The microinstruction from the microinstruction register 107 controls the respective units in the CPU. The processings of the instruction processing unit 101, the address counting unit 102, and the main memory interface 103 are of routine type. Except of a request of an exceptional processing, the microprogram gives a job start instruction for a large unit job to the respective units. For further detailed control, the hardwired control logic of each unit is used and the respective units operate under such control. The address for reading out the control memory unit 108 is fed from a sequence control unit 108. The sequence control unit 108 has microinstructions, the result of calculation and like given from other units. The control unit 108 successively feeds addresses read out in order that the program is executed in a proper order. To the sequence control unit 108 is transferred an instruction code of an instruction to be next executed from the instruction processing unit 101. That is, when the microprogram of which the instructions are currently processed is completed in execution, the sequence control unit 108 has it start to execute the program corresponding to the instruction. The test conducted during the system operation is initiated by the sequence control unit 108.

Figure 12:
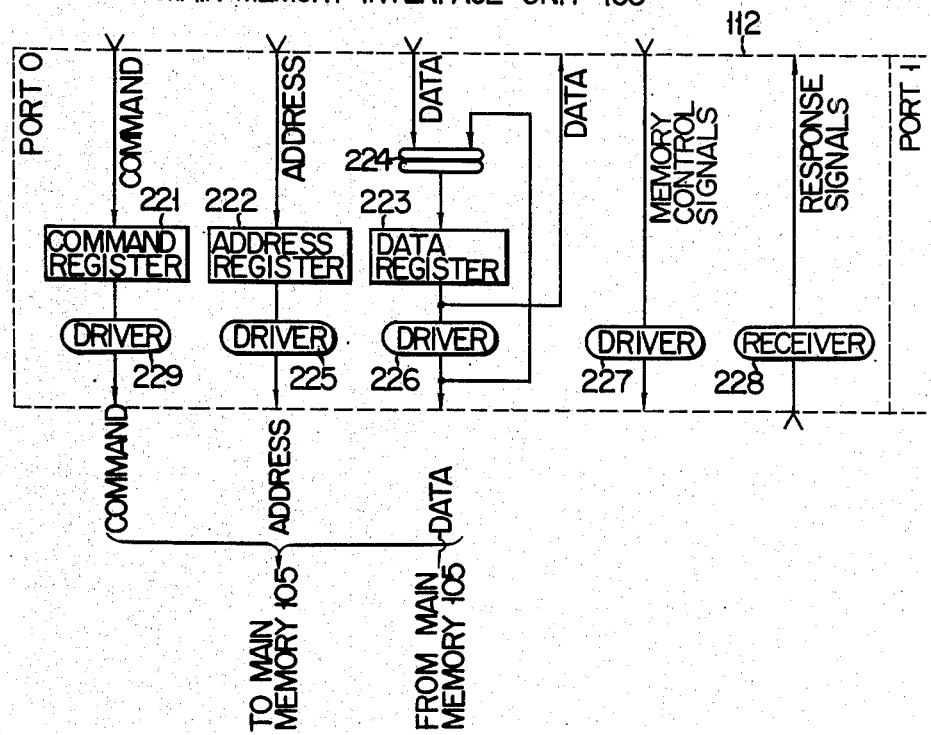
FIG. 12 is a block diagram illustrating an I/O port used in the system of FIG. 11.

FIG. 12 shows the details of the port 0 in the main memory interface unit 103. In the figure, registers 221 to 223 are illustrated for storing command, address and data, respectively. The transfer of command and address is unidirectional and that of data is bidirectional. Between the port 112 and the main memory 105 is inserted a bidirectional path. In writing into the main memory, a selector 224 of a port 112 selects data transferred from the arithmetic unit 104 and inputs it into the data register 223. In reading out from the main memory, it inputs into the data register 223 data transferred from the main memory 105 through the bidirectional path. The selection operation of the selector 224, together with other registers in the port, is controlled by a port control circuit (to be referred to later) in the main memory interface unit 103. The transfer of an operation instruction signal to the main memory 105 and a response signal from the main memory 105 to the operation instruction signal is performed through the port 112.

The operation instruction signal is a control signal necessary for transfer a command to all the main memories 105. In the absence of the operation instruction signal, the main memory is inoperative. Numerals 225, 226 227 and 229 designate drivers and 228 a receiver. Although a port 1 is not illustrated, it is the same as the port 0.

Figure 13:
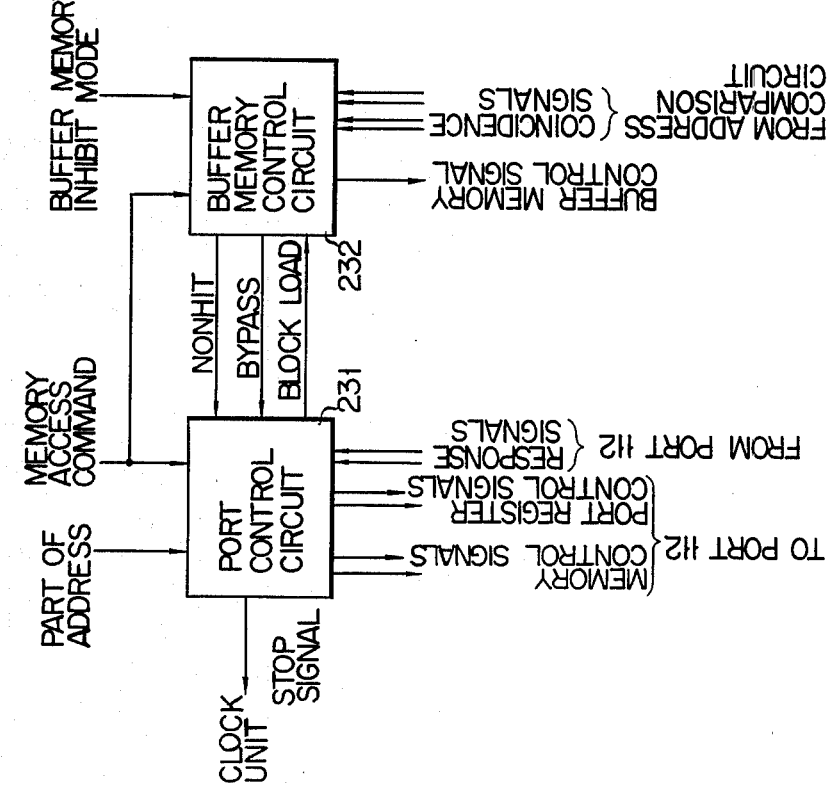
FIGS. 13 and 14 illustrate portions of the main memory interface employed in the FIG. 11 system.

FIG. 13 shows a block diagram of a part of the control circuit in the main memory interface unit 103. In FIG. 13, when a memory access instruction for reading out the operand is given, an address comparing circuit (not shown) checks to see if the corresponding address is copied into a buffer memory 111 under control of a buffer control circuit 232. If the comparing circuit finds coincidence between the addresses, the copied contents of the corresponding address is read out and immediately transferred as an operand to the arithmetic unit 104. Accordingly, when the copy of the corresponding address is stored in the buffer memory 111, none of the control signal is transferred from the buffer memory control circuit 232 to the port control circuit 231. When the addresses are not coincident, the address comparator does not transfer a coincident signal so that the buffer control circuit 232 transfers a "nonhit" $\overline{H}$ signal to the port control circuit 231. The port control circuit 231 reads out data from the corresponding address by the memory access instruction which has been received by the circuit 231. When the reading out of data from the main memory has been finished, the port control circuit 231 transfers a block load signal to the buffer control circuit 232. The buffer memory control circuit 232 transfers the data read out as an operand to the arithmetic unit 104 and writes the same into the buffer memory 111.

In the case of the nonhit $\overline{H}$, it takes some time till the operand is actually gained. The port control circuit 231 transfers a stop signal to exterior (clock unit), to stop the operation of the rest of the CPU during that time, and waits for the operand read out of the main memory 105.

To the buffer memory control circuit 232, is transferred a buffer memory inhibition signal (use inhibition mode) from a mode register (not shown). In the presence of the buffer memory prohibit signal, the buffer memory control circuit 232 does not change the inside state of the buffer memory 111, transfers a bypass signal of the buffer memory 111 to the port control circuit 231. In this manner, the port control circuit 231 operates as if no buffer memory is used. The mode register is operable in read and write by a machine language instruction to decide the operation mode of the CPU.

Between the port control circuit 231 and the respective ports, a port signal is transferred every port.

Having described the general configuration of the CPU used in this embodiment of the invention, an embodiment of the invention will now be described. Its general operation will first be outlined. In the invention, the contents of the main memory 105 is protected by hardware through an operation as if all the addresses of the main memory 105 are degenerated into the data register 223. (The word degenerate is commonly used in quantum physics and has a similar meaning.) With respect to the setting of the test data which is necessary before test execution, its one time setting in the data register 223 permits it to operate as if any address is freely accessed.

More precisely, all the addresses of the main memory 105 accessed through the port n are degenerated into the data register 223 in the port n.

The portion of the main memory 105 which is most frequently accessed at present is copied and thereafter the access to that portion is processed at a high speed. To this end, the buffer memory 111 is used, as seen from the foregoing. The memory contents of the buffer memory 111 must also be protected like the main memory 105. The memory contents of the buffer memory 111 may be easily protected by forcibly placing it to be in the buffer memory inhibition mode. The buffer memory inhibition mode also inhibits the test of the buffer memory itself. However, the memory elements (as well known, the directory part, the data part, and the control flag part) occupying the most of the buffer memory are parity-checked. For this, those memory elements do not constitute the object of the fault-detection in the embodiment of the invention. The logical circuits of the remaining buffer memory concerns are small so that they may be fault-checked by the conventional method. The corresponding buffer memory directory is searched by using the means to read out the address having accidentally been stored in the buffer memory and to find a coincidence, and the fact that an instruction to be next executed is necessarily loaded into the buffer memory. The test is conducted by means to check that its number is stored in the directory. In such a manner, the desired falut detection rate is gained. The just-mentioned method may be more simplified or the duplication of the logic circuits of control concerns is further required, depending on the degree of the fault detection rate required.

Figure 14:
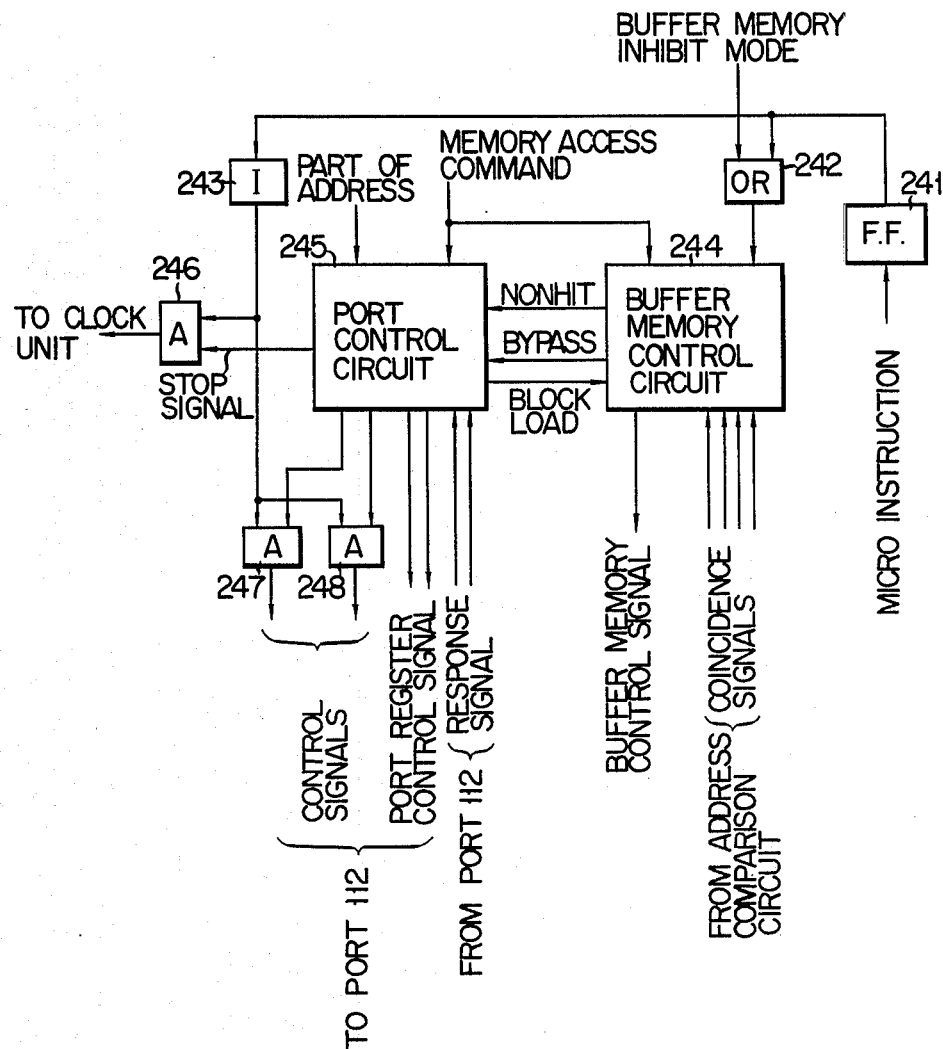

A further embodiment of the invention will be given with reference to FIG. 14. FIG. 14 shows a block diagram of a control circuit of the main memory interface 103 improved by the invention. As shown, the address degeneration flip-flop 241 is provided. The flip-flop 241 is operable under control of the microinstruction in order to be freely set/reset in the test program. The flip-flop 241 may be set when the test is initiated and reset when it is terminated. The output of the address degeneration flip-flop 241 is applied to an OR gate 242 and an inverter 243. The output of it and the buffer memory inhibition mode signal are ORed by the OR gate 242. The output of the OR gate 242 is applied to the buffer memory control circuit 244, like the buffer memory inhibition mode signal. A stop signal going to the clock unit and an operation instruction signal going to the port 0 and the port 1 are applied to AND gates 246, 247 and 248, respectively. The output of the inverter 243 is applied to the other inputs of the same gates.

The operation of this embodiment of the invention will be described in detail.

When the address degeneration flip-flop 241 is reset, the control circuit in FIG. 14 operates as in the control circuit in FIG. 13. The details of it will be omitted.

When the address degeneration flip-flop is set, i.e. this means the initiation of the test program, it operates in the following. Upon an output of the OR gate 242, the buffer control circuit 244 operates as if the buffer memory inhibition mode signal is "1". That is, the buffer memory control circuit 244 does not change the contents of the buffer memory and transfers a bypass signal to the port control circuit 245. Accordingly, every time that the memory access instruction is issued, the port control circuit 245 operates as if the buffer memory is not used.

If the memory access instruction instructs to write data into the address A of the main memory 105, the port control unit 245 sees the bits of a part of the address given and selects the port. Assume now that the port 0 is selected. A port register control signal sent from the port control circuit 245 loads commands, addresses and data into the command register 221, the address register 222 and the data register 223 in the port 0(12) shown in FIG. 12. Then, the port control circuit 245 tries to send the operation instruction signal to the main memory unit 105, the port 112. However, the output of the inverter 243 is "0" so that the AND gates 247 and 248 block the transfer of the operation instruction signal to the port 112. That is, at the start of the test program, the address degeneration flip-flop 241 is set so that, if an instruction is issued to write into the main memory 105, the writing is not actually performed. This indicates that the set of the address degeneration flip-flop 241 protects the memory contents of the main memory 105. However, the data transferred to be written into the address A remains in the data register 223 of the port 0 112.

Assume now that a memory access instruction to read out the operand transferred from the address B and that the B address is to be accessed through the port 0 112, like the address A. At this time, the port control circuit 245 has received a bypass signal from the buffer memory control circuit 244. Accordingly, the port control circuit 245 loads the command and address into the command register 221 and the address register 222, respectively. The port control circuit 245 tries to send an operation instruction signal to the main memory unit 105 and a stop signal to the clock unit (not shown). However, the output of the inverter 243 is "0" so that the AND gates 246 to 248 block the transfer of the stop signal and the operation instruction signal.

In the normal condition, i.e. when the address degeneration flip-flop 24 is not set, the system will be operated in the following manner. The main memory 105 is driven. The contents of the address B is read out to be sent to the port 112 through the data line. Further, the response signal is sent to set the data in the data register 223 in the port and to stop the stop signal having been alive till then. As described above, when the address degeneration flip-flop 241 is set, the CPU proceeds directly to the next operation step, without a series of operation steps. This operation means that the read-out instruction is executed for time zero (the time for transferring the stop signal to the clock unit is zero) and the data read out have been stored in the data register 223 in the port 112.

That is, in the case of this example, the data read out from the address B is in fact the data having been stored in the address A (stored in the data register 223 in FIG. 12). Accordingly, the addresses are insignificant and all the addresses have been degenerated into the data register 223 in the port 112.

The description of the various embodiments of the invention is here concluded. The following describes how to prepare the test program effectively using the invention.

The invention is used by using the test program to be executed for the purpose of the fault detection in the system operation. As described above, the major object of the invention is to reduce memory capacity of the scratch pad memory used by the test program and to shorten the time required for the test program execution. Additionally, the invention has an object to apply the invention itself for a data processing system of which the logical circuits of the main memory access concerns are of the hardwired control type.

In the light of the objects, the following measure is preferable. The data stored in the main memory is protected by hardware. With respect to known data necessary for the test, only the first test of a series of tests is initialized of the data register 223 by writing the known data of the test program into the main memory. In the succeeding test, the data loaded as a result of the test must be used as far as possible as the data of the next test, without any change.

If there is a fault in the portions exercised in the above-mentioned test, the data loaded as a result of the test into the main memory (in fact, the data register 223 in the port 12) are possibly erroneous. The erroneous result is used as the data of the next test so that the test result is erroneous.

However, if the object of the test is only to know the presence of a fault and the saving area of the software visible register is surely protected, such "nonsense" processing does not given an adverse effect and does not damage the object of the test. In the embodiment, the operation instruction signal is transferred from the CPU, through the port 112. In fact, the system control unit between the port 112 and the main memory device 105 transfers the operation instruction signal to the peripheral apparatus, through a channel device (not shown). Accordingly, the AND gates 247 and 248 in FIG. 14 block the transfer of the operation instruction signal to the main memory 105 and at the same time to the peripheral apparatus. When the invention is applied to such an information processing system as to have a separate circuit for transferring an instruction to the peripheral apparatus, the circuit corresponding to the AND gates 247 and 248 must be provided in the transfer circuit of the operation instruction signal.

This embodiment of the invention is so designed that the data processing system can not be stopped from the microprogram. Additionally, the exceptional processing sequence accompanied by a fault detection is also designed so as not to proceed beyond a fixed returnable point.

If necessary, however, the test program may be prepared so that the known data is loaded into the data register before the test is initiated. When a plurality of operands are needed in the test which can be decomposed into only one, it is impossible to previously set up the individual operands. In this case, the test is conducted in the single step mode and, with the progression of the test, the test data to be succeedingly read out is loaded into the data register.

Other disadvantages of the method using the result of the proceeding test as the data of the succeeding test are: since the individual tests are unseparable, it is difficult to design the test; when the hardware to which the test program and test are directed is changed, the effect of the change is pronounced. For avoiding the disadvantages, by convention, in preparation of the test program, it is so designed that the proceeding test and the succeeding test are separated as the situation permits. In the test conducting during the system operation, however, the memory capacity for storing the test program must be as small as possible. The effective measure for this is to reduce the data memory area for test and to use the result of the preceeding test as the data of the succeeding test. Additionally, if the recently developed fault simulation method is employed in the design of the test program, the above two disadvantages may be overcome.

The following is preferable for the design and modification of the test program. The result of the preceeding test is used as the data to the succeeding test. It is to clarify the object for the test and the condition of the test input data. The basic interrelation of the overall test is designed by a human, together with the test input data of the first test. When it is fault-simulated, we can see various facts: the kind of the fault in the test; the kind of the data loaded into the register, the memory and the like as the test result; the kind of data to be transferred to the next test; and number of undetected faults. A designer modifies the test program so as to rewrite the contents of a small number of registers and the memories between adjacent successive tests, or uses additional tests, on the basis of the result of the simulation, in order to obtain a desired fault detection rate. In this manner, the test program may be designed by the aid of the fault-simulator.

When it is desired to modify the test program or the hardware, the modification is first carried out by the fault-simulator. A designer sees how the modification effects the tests and what fault can not be detected from the output of the fault simulator, and takes suitable countermeasures on the basis of the simulation results, as in the manner of the modification at the test program design.

The detects resulting from using the result of the preceeding test as the data of the succeeding test may almost be improved by designing and maintaining the test program through the use of the fault simulator.

Since, in the invention, the address information is ignored as a consequence (the bit used for the port selection is not ignored), the data path of the address information must be tested by using a conventional method, in the test program preparation.

The explanation to follow describes the case where a data processing system is provided with an associative addressing function and the address counting unit 102 in FIG. 11 has an associative memory for associative address—real address conversion.

The associative memory is essentially a copy of an associative address—real address conversion table stored in the main memory unit 105. To realize the hardware for associative memory type accessible at a high rate, a part of the associative address—real address conversion table stored in the main memory unit is slightly changed and stored, as a situation needs. However, it is substantially a copy of the main memory table, as the buffer memory stores a copy of a part of the main memory unit with respect to the instruction word and data. Even when the associative memory is used, it may basically be executed like the control of the buffer memory shown in FIG. 4. That is, when the address degeneration flip-flop is set, it is forced to be in an associative memory use inhibition state thereby to inhibit the contents of the associative memory from being changed. The control circuit when the associative memory is used is not illustrated.

Thus, when the associative address—real address conversion is required, address counting unit 102 accesses the associative address—real address conversion table to execute the necessary conversion.

And the access reduces into the data register 223 in the port 112 through the action of the address degeneration flip-flop of the invention.

In this example of the invention, when the address conversion is initiated, the operation of the other units is stopped and only the address conversion function is conducted to read out the data from a plurality of main memory units in the course of the address conversion. Accordingly, when the portion of the main memory to be address-converted is tested, the address conversion part is operated in a single step mode so that a test program is inserted between it and the main memory unit access to enable the data register in the port 112 is rewritten by using a diagnostic command. In such a manner, the operation when a conversion table with any contents is read out is performed to permitting the test.

Figure 15:
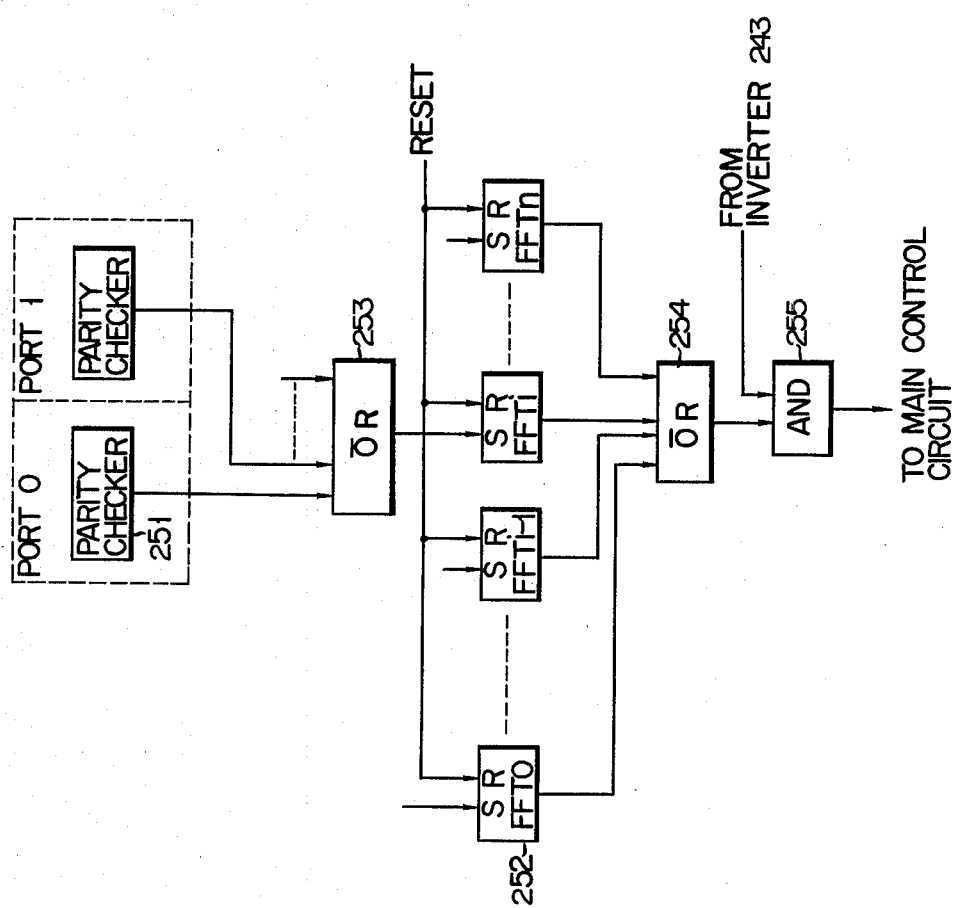
FIG. 15 shows an example of an exception detection circuit which may be used with the system of FIG. 11.

The test of an exception detecting means will be given referring to FIG. 15.

In the case of the main memory, for example, the information processing system of this example of the invention has a function to send data with parity error to the main memory 105. Accordingly, the address is degenerated and, when the test is conducted, the data with parity error is loaded into the data register of the port by using its function, and then the data is read out to detect the parity error by a parity checker 251. Additionally, one FFTi of the flip-flops 252 for exception detection is set to check to see if the parity check is surely detected. The exception detection flip-flops 252 are grouped in accordance with the nature of the exception, to initiate an exception processing procedure. However, just before the exception processing procedure is initiated, the output of the inverter in FIG. 14 drives the AND gate 255 to place the initiating or start signal to be in an inhibition condition, so that the exception detection procedure is not initiated in the address degeneration mode. In this way, the exception detection means in the CPU is easily tested. In the example of the invention, the flip-flop comprising flip-flops FFTo to FFTn for exception detection is so arranged as to be seen as a single (n+1) bit register. Therefore, the result of the exception detection is readily tested.

Furthermore, exceptions such as trouble of the power supply of the information processing system, an overflow of a timer, an operation end interruption of the input/output unit are classified into separate groups, with respective to the ones relating to the control of an entire system and an exception detection. On the other hand, the inhibition by the address degeneration flip-flop 255 as shown in FIG. 5 is not performed. In FIG. 15, numerals 253 and 254 designate OR gates and numeral 255 and AND gate.

In the present invention, since the data register 223 is used in the port 112, the entire addresses of the main memory are degenerated into the data register 223. However, when the invention is applied to an information processing system in which only one data register is used in the main memory interface 103 and not in the port 112, the data register may be used. Alternatively, the data register may newly be provided in the main memory interface unit 103.

As described above, according to the invention, there is eliminated a need for saving the data in the main memory for conducting the test, and therefore, a need for the time and the procedure for the saving and the restoration. Therefore, the time required is shortened and the memory capacity of the scratch pad memory and the memories for storing the test program may also be saved. Additionally, the data stored in the buffer memory are not destroyed and therefore the efficiency of the information processing by the user is not deteriorated after the test is ended.

The untestable portions when the invention is applied are the main memory, the buffer memory and the associative memory; however, most of those are composed of memory elements which are parity checked. Therefore, the fault detection rate is not materially reduced. The address degeneration flip-flop of the invention is controllable by the test program. Accordingly, a conventional fault testing method may also be used in the test program.

Since the address is reduced, there is no need for previously write the data for the test into the address to be address in the test before the test execution. The result of the preceeding test may be used as data of the succeeding test.

This indicates that it is unnecessary to store the test data and to set that data. The time required for test execution is shortened and the capacity of the memory for storing the test program is conserved.

Additionally, the address and the data are separated so that the test of the address forming circuit and the test independent from the former may be concurrently performed. Furthermore, the test is executed as if the access time of the main memory is zero. Therefore, the time required for the test execution is shortened.

What we claim is:

1. A microprogrammed information processing system having a self-checking function comprising:

a central processing unit including means for executing microinstructions and having a control store for storing a microprogram including a sequence of microinstructions, said central processing unit further including means for periodically placing said unit in an idle state;

microinstruction register means included in said central processing unit and connected to said control store for storing microinstructions read out from said control store;

an exclusive fault test memory for exclusively storing commands which include addresses of microinstructions stored in said control store, the microinstructions addressed by said commands being selected under control of said commands to perform fault testing routines in said system; and a fault test control circuit connected to said control store and said exclusive fault test memory and operable under control of said microinstruction execution means in said central processing unit, said fault test control circuit having means for reading out said commands from said exclusive fault test memory when said central processing unit is in said idle state and means for interpreting and executing the commands read out from said exclusive fault test memory, said fault test control circuit addressing said control store in response to said commands from said exclusive fault test memory causing said central processing unit to execute at least one microinstruction read out from said control store, thereby performing an operation checking procedure to check the operation of said central processing unit.

2. The microprogrammed information processing system according to claim 1, wherein said commands stored in said exclusive fault test memory include at least a command field and an address field to address said control store in order to read therefrom said microinstructions.

3. The microprogrammed information processing system according to claim 2, wherein one of the commands stored in said exclusive fault memory test includes a function code in said command field adapted, when read out by said fault test control circuit, to control said central processing unit to operate in a single instruction mode.

4. The microprogrammed information processing system according to claim 1, wherein said control store stores at least one microprogram for executing a DIS instruction which keeps said central processing unit in the idle state until an external signal is received and which contains a microinstruction which initiates operation of said fault test control circuit.

5. The microprogrammed information processing system according to claim 4, wherein said central processing unit further includes general registers and a memory unit, and wherein, prior to the execution by said microinstruction execution means in said central processing unit of the microinstruction which initiates operation of said fault test control circuit, said execution means executes microinstructions in said control store for transferring data in said general registers to said memory unit and further executes microinstructions for initializing said central processing unit for said checking operation, thereby preparing said system to check the operation of said central processing unit.

6. The microprogrammed information processing system according to claim 1, wherein said control store stores a series of fault testing microinstructions comprising a check result accumulation routine for collecting and converting into a compressed data word check result data generated and stored in said central processing unit during execution of previous check result accumulation routines.

7. The microprogrammed information processing system according to claim 1, wherein a particular command stored in said exclusive fault test memory is adapted, when read out by said fault test control circuit, to address and initiate the execution of a check result accumulation microprogram routine stored in said control store.

8. The microprogrammed information processing system according to claim 7, wherein said reading out means in said fault test control circuit operates to read out said particular command upon completion of each checking sequence performed by said central processing unit, thereby converting the check results into a compressed data word upon completion of all said checking sequences.

9. The microprogrammed information processing system according to claim 8, wherein said reading out means in said fault test control circuit further operates upon completion of said operation checking sequences of said central processing unit to read out from said exclusive fault test memory commands for addressing and restarting the execution of a DIS instruction from said control store, thereby causing said central processing unit to restart the execution of said DIS instruction.

10. The microprogrammed information processing system according to claim 1, in which said fault test control circuit controls said central processing unit to execute at least one of said microinstructions in response to said commands and said reading out means operates to read out a subsequent command from said exclusive fault test memory when execution of said microinstruction is terminated.

11. The microprogrammed information processing system according to claim 1, in which said fault test control circuit includes a timer for measuring the time elapsing after the execution of said operation checking procedure, and said fault test control circuit further includes means responsive to said commands stored in said fault test memory when said central processing unit is in said idle state and to the state of said timer, to execute said operation checking procedure.

12. The microprogrammed information processing system according to claim 1, wherein said fault test control circuit includes means responsive to a predetermined microinstruction stored in said microinstruction register to interrupt the execution of said operation checking procedure in response to the termination of the idle state of said central processing unit.

13. The microprogrammed information processing system according to claim 1 further comprising:
at least one main memory unit;
means included in said central processing unit for accessing said main memory unit;
means connected to said microinstruction register means and to said main memory accessing unit and responsive to a sequence of microinstructions read out from said control store into said microinstruction register means for controlling said central processing unit to access said main memory unit for read operations and for write operations;
a maim memory control means conneced to said main memory and to said microinstruction register means to apply control signals to said main memory unit in response to said microinstructions applied to said register means to control said main memory unit;
input-output register means connected to said main memory unit for temporarily storing the data to be written into said main memory in response to said microinstructions and for temporarily storing the data read out from said main memory in response to said microinstructions;
signal generating means connected to said main memory control means to generate a timing control signal for causing said central processing unit to wait for the data read out from said main memory;
bistable means connected to said microinstruction register means and adapted to be set under the control of at least one of said microinstructions included in said microprogram when said microinstruction is read into said microinstruction register means;
first inhibiting means connected to said main memory control means and to said bistable means to inhibit sending said control signals when said bistable means is in the set state; and
second inhibiting means connected to said signal generating means and to said bistable means to inhibit the generation of said timing control signal when said bistable means is in the set state, said microinstruction operating to force said bistable means to said set state prior to said operation checking procedure to enable use of said input-output register means as said main memory during said operation checking procedure.

14. The microprogrammed information processing system according to claim 13, further comprising an additional main memory having a copy of a part of the contents of said main memory stored therein; and further memory control means for placing said additional main memory in an inhibiting condition when said bistable means is in said second state.

15. The microprogrammed information processing system according to claim 13, further comprising: an exception detection circuit; an exception processing circuit driven by said exception detection circuit; and a circuit coupled to said exception processing circuit and to said bistable means to block initiation of said exception processing circuit when said bistable means is in said second state.

16. A fault detection method for a microprogrammed information processing system which has a central processing unit having a control store for storing microprograms comprising a sequence of microinstructions, a microinstruction register for storing a selected one of said microinstructions, data processing circuits which are controlled by said microinstructions and are to be fault tested, and at least one additional register controlled by said selected microinstruction and coupled with said data processing circuits, said central data processing unit being coupled with an exclusive fault test memory for exclusively storing diagnostic commands and with a control circuit which addresses said exclusive fault test memory to read out one of said commands from said memory and execute said command, comprising the steps of:
  initializing said control circuit for operation when said central processing unit is in an idle state;
  entering into said microinstruction register a first selected microinstruction addressed by said diagnostic command read out from said exclusive fault test memory;
  executing said first selected microinstruction to load said additional register with at least a part of the output signals of said circuits to be tested;
  entering into said microinstruction register a second selected microinstruction addressed by said diagnostic command read out from said exclusive fault test memory; and
  executing said second selected microinstruction to supply at least a part of the contents of said additional register to said data processing circuits to be fault tested.

* * * * *